(12) United States Patent
Haynes et al.

(10) Patent No.: US 8,250,473 B1
(45) Date of Patent: *Aug. 21, 2012

(54) VISUALIZING OBJECT BEHAVIOR

(75) Inventors: Jeremy S. Haynes, Seattle, WA (US); Michael W. Friedman, Seattle, WA (US); Andrew H. Otwell, Seattle, WA (US); Frederick J. Werbel, Sammamish, WA (US)

(73) Assignee: Amazon Technoloies, Inc., Reno, NV (US)

( * ) Notice: Subject to any disclaimer, the term of this patent is extended or adjusted under 35 U.S.C. 154(b) by 745 days.

This patent is subject to a terminal disclaimer.

(21) Appl. No.: 12/365,033

(22) Filed: Feb. 3, 2009

(51) Int. Cl.
*G06F 15/177* (2006.01)

(52) U.S. Cl. .......................... 715/736; 715/772; 709/224

(58) Field of Classification Search .................. 715/736, 715/772; 709/224
See application file for complete search history.

(56) References Cited

U.S. PATENT DOCUMENTS

| | | | |
|---|---|---|---|
| 5,754,939 A | 5/1998 | Herz et al. | |
| 5,870,559 A | 2/1999 | Leshem et al. | |
| 6,031,537 A | 2/2000 | Hugh | |
| 6,072,490 A * | 6/2000 | Bates et al. | 715/821 |
| 6,144,962 A | 11/2000 | Weinberg et al. | |
| 6,154,212 A | 11/2000 | Eick et al. | |
| 6,166,739 A | 12/2000 | Hugh | |
| 6,182,097 B1 * | 1/2001 | Hansen et al. | 715/234 |
| 6,212,545 B1 * | 4/2001 | Ohtani et al. | 709/202 |
| 6,434,556 B1 | 8/2002 | Levin et al. | |
| 6,449,604 B1 * | 9/2002 | Hansen et al. | 1/1 |
| 6,584,504 B1 * | 6/2003 | Choe | 709/224 |
| 6,757,740 B1 | 6/2004 | Parekh et al. | |
| 6,766,370 B2 | 7/2004 | Glommen et al. | |
| 6,784,901 B1 * | 8/2004 | Harvey et al. | 715/757 |
| 6,961,910 B2 | 11/2005 | Lee et al. | |
| 7,165,105 B2 * | 1/2007 | Reiner et al. | 709/224 |
| 7,219,300 B2 * | 5/2007 | Arquie et al. | 715/736 |
| 7,260,551 B2 | 8/2007 | Phillips | |
| 7,383,334 B2 | 6/2008 | Wong et al. | |
| 7,426,687 B1 | 9/2008 | Schultz et al. | |
| 7,441,195 B2 | 10/2008 | Error et al. | |
| 7,464,187 B2 | 12/2008 | Glommen et al. | |
| 7,493,317 B2 | 2/2009 | Geva | |
| 7,502,994 B2 | 3/2009 | Kocol | |
| 7,542,918 B2 | 6/2009 | Rolleston Phillips | |
| 7,584,435 B2 | 9/2009 | Bailey et al. | |
| 7,603,373 B2 | 10/2009 | Error et al. | |

(Continued)

OTHER PUBLICATIONS

Google Analytics: Make Profit-Generating Improvements to Your Advertising and Website, Google, <http://web.archive.org/web/20080730065058/www.google.com/analytics/features.html>, Jul. 30, 2008.

(Continued)

*Primary Examiner* — Tuyetlien Tran

(74) *Attorney, Agent, or Firm* — Knobbe, Martens, Olson & Bear LLP

(57) ABSTRACT

A visualization service generates a graphical representation or visualization of each user's behavior within a network resource, such as a website. In one example, the visualization service provides a dynamic visualization of each user accessing the network resource. Each user is graphically represented in the visualization with an indicium, such as a point or dot. The visualization (and thus, the position of each indicium representing a user) is dynamically updated as each user accesses data files from the network resource and thus, moves from state to state (or page to page) over time. The effect is similar to watching cars move along a complex highway system.

13 Claims, 14 Drawing Sheets

U.S. PATENT DOCUMENTS

| | | | |
|---|---|---|---|
| 7,617,186 | B2 | 11/2009 | Scherer et al. |
| 7,620,697 | B1 | 11/2009 | Davies |
| 7,673,340 | B1* | 3/2010 | Cohen et al. .................... 726/22 |
| 7,792,844 | B2* | 9/2010 | Error et al. .................... 707/754 |
| 7,809,752 | B1* | 10/2010 | Kozyrczak et al. ........... 707/790 |
| 7,945,658 | B1* | 5/2011 | Nucci et al. .................... 709/224 |
| 2002/0019837 | A1* | 2/2002 | Balnaves ...................... 707/512 |
| 2002/0070953 | A1* | 6/2002 | Barg et al. .................... 345/700 |
| 2002/0087679 | A1 | 7/2002 | Pulley et al. |
| 2002/0089532 | A1* | 7/2002 | Cohen et al. .................. 345/736 |
| 2002/0129363 | A1* | 9/2002 | McGuire ........................ 725/37 |
| 2002/0130907 | A1* | 9/2002 | Chi et al. ...................... 345/853 |
| 2002/0147805 | A1* | 10/2002 | Leshem et al. ................ 709/223 |
| 2002/0188864 | A1 | 12/2002 | Jackson |
| 2003/0023715 | A1* | 1/2003 | Reiner et al. .................. 709/224 |
| 2003/0115333 | A1* | 6/2003 | Cohen et al. .................. 709/227 |
| 2003/0126613 | A1* | 7/2003 | McGuire ....................... 725/109 |
| 2003/0128233 | A1* | 7/2003 | Kasriel .......................... 345/738 |
| 2003/0131097 | A1* | 7/2003 | Kasriel et al. ................. 709/224 |
| 2003/0184580 | A1* | 10/2003 | Kodosky et al. .............. 345/734 |
| 2003/0214504 | A1* | 11/2003 | Hao et al. ..................... 345/440 |
| 2004/0001104 | A1 | 1/2004 | Sommerer et al. |
| 2004/0030741 | A1* | 2/2004 | Wolton et al. ................ 709/202 |
| 2004/0059746 | A1* | 3/2004 | Error et al. .................... 707/102 |
| 2004/0174397 | A1* | 9/2004 | Cereghini et al. ............ 345/855 |
| 2004/0189701 | A1* | 9/2004 | Badt, Jr. ........................ 345/753 |
| 2004/0243944 | A1* | 12/2004 | Sabiers et al. ................ 715/853 |
| 2005/0039132 | A1* | 2/2005 | Germain et al. .............. 715/736 |
| 2006/0015824 | A1* | 1/2006 | Chrysanthakopoulos .... 715/835 |
| 2006/0184886 | A1* | 8/2006 | Chung et al. .................. 715/758 |
| 2007/0143343 | A1* | 6/2007 | Iverson ...................... 707/104.1 |
| 2007/0184855 | A1* | 8/2007 | Klassen et al. ................ 455/457 |
| 2007/0233511 | A1 | 10/2007 | Winters et al. |
| 2007/0255754 | A1* | 11/2007 | Gheel ........................ 707/104.1 |
| 2008/0004940 | A1 | 1/2008 | Rolleston Phillips |
| 2008/0046218 | A1* | 2/2008 | Dontcheva et al. ........... 702/186 |
| 2008/0091553 | A1* | 4/2008 | Koski ............................. 705/26 |
| 2008/0181463 | A1 | 7/2008 | Error |
| 2008/0183860 | A1 | 7/2008 | Error |
| 2008/0184113 | A1* | 7/2008 | Error ............................ 715/700 |
| 2008/0201357 | A1* | 8/2008 | Error et al. .................... 707/102 |
| 2008/0201638 | A1* | 8/2008 | Nair .............................. 715/706 |
| 2008/0249905 | A1 | 10/2008 | Wong et al. |
| 2008/0256444 | A1* | 10/2008 | Wang et al. ................... 715/700 |
| 2009/0006995 | A1* | 1/2009 | Error et al. .................... 715/764 |
| 2009/0024962 | A1* | 1/2009 | Gotz ............................. 715/838 |
| 2009/0037579 | A1 | 2/2009 | Error et al. |
| 2009/0063517 | A1 | 3/2009 | Wright et al. |
| 2009/0083421 | A1 | 3/2009 | Glommen et al. |
| 2009/0172159 | A1 | 7/2009 | Kocol |
| 2009/0327402 | A1* | 12/2009 | Bernstein ...................... 709/203 |
| 2010/0169792 | A1* | 7/2010 | Ascar et al. ................... 715/744 |
| 2010/0185640 | A1* | 7/2010 | Dettinger et al. ............. 707/758 |

OTHER PUBLICATIONS

Holter, E., Google's Site Overlay: Visual Website Design Analysis, Newfangled Web Factory, <http://www.newfangled.com/googles_site_overlay_visual_website_design_analysis>, Jun. 2005.

Inside Scoop on Google Analytics Funnel Visualization Report: Digital Marketing Factor, Webmetro, <http://www.webmetro.com/blog/Web_Analytics?Inside_Scoop_on_Google_Analytics_Fun...>, Jul. 11, 2008.

Reed, M., Using Google Analytics Site Overlay, CommunitySpark.com, <http://www.communityspark.com/using-google-analytics-site-overlay/>, Apr. 13, 2007.

Teixeira, J., Let's Talk About Funnel Visualization: The Analytics and Site Intelligence Blog @ More Analytics, More Visibility, <http://www.morevisibility.com/analyticsblog/lets-talk-about-funnel-visualization.html>, Sep. 18, 2008.

* cited by examiner

VISUALIZING OBJECT BEHAVIOR

BACKGROUND

Web analytics is the measurement of the behaviors of visitors to a website. In an electronic commerce context, it refers to the measurement of which aspects of an entity's website work towards the business objectives; for example, which landing pages encourage people to make a purchase. There are at least two categories of web analytics, off-site and on-site web analytics. Off-site web analytics refers to web measurement and analysis of a website's potential audience, visibility and level of interest in an electronic network, e.g., the Internet, as a whole. Whereas, on-site web analytics refers to analyzing a visitor's journey once on a website, for example, specific landing pages. In on-site web analytics, data is typically analyzed against key performance indicators to improve website performance, increase traffic to a website, etc.

The two main technological approaches for collecting data to be analyzed by on-site web analytics software are the use of log-file analysis, page tagging, or both. The first method, log-file analysis, reads the log-files in which the web server records all of its transactions. The second method, page tagging, uses an embedded software script in a web page to notify a third party server when a page is rendered by a web browser. Both types of approaches collect data that can be processed to produce web traffic reports. Integrating such web analytics approaches into the server is gaining popularity due to increases in need for real-time or near real-time improvements in performance.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
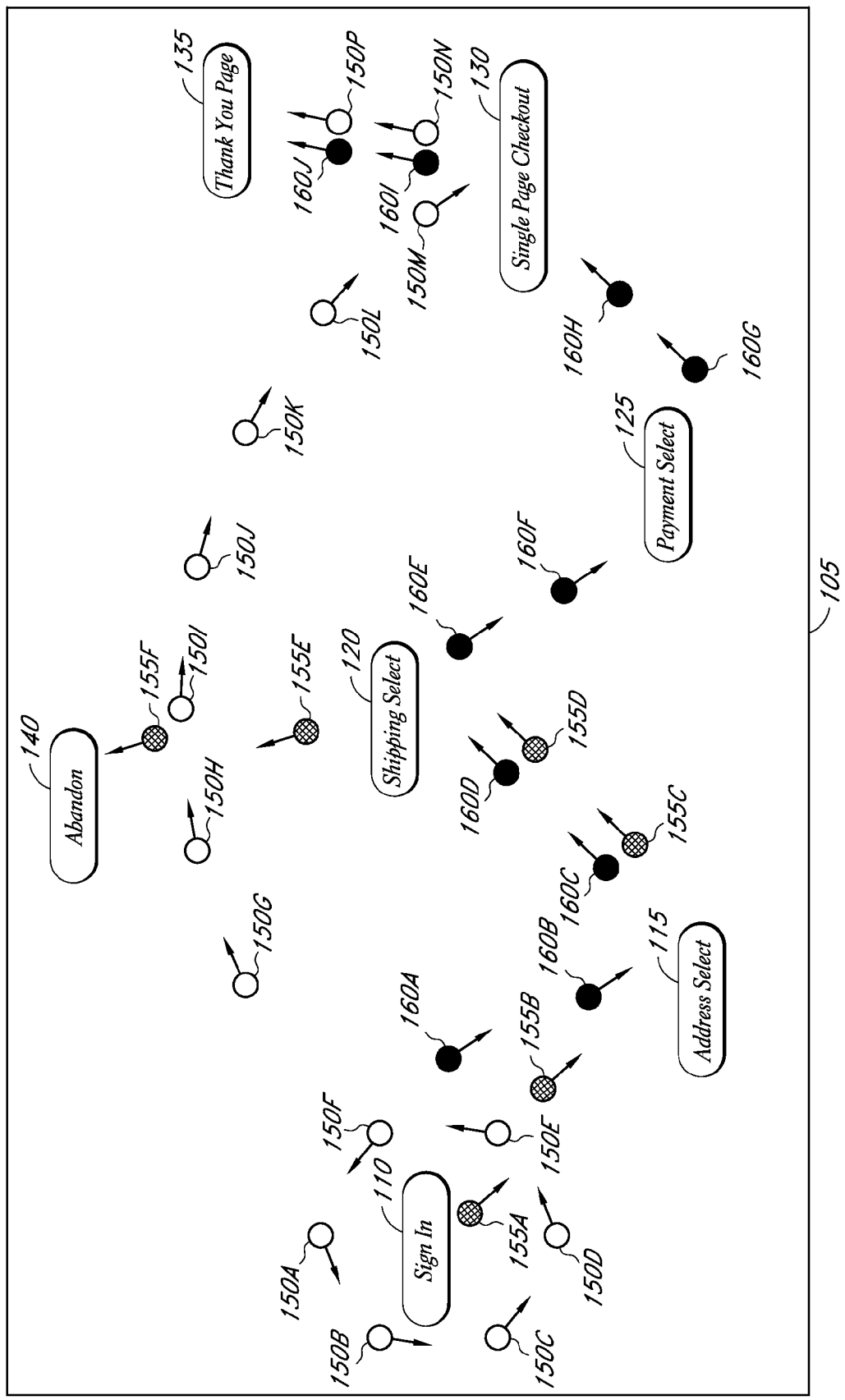
FIG. 1 is an illustrative graphical representation or visualization of the behavior of a small sample of users accessing a network resource.

Specific embodiments of the disclosure will now be described with reference to the drawings. The terminology used in the description presented herein is not intended to be interpreted in any limited or restrictive manner, simply because it is being utilized in conjunction with a detailed description of certain specific embodiments of the disclosure.

Generally described, aspects of the present disclosure relate to graphically representing or "visualizing" the behavior of users as they access a network resource, such as a website. In this regard, a visualization service is described that generates a graphical representation or visualization of each user's behavior within the network resource. In one example, the visualization service provides a dynamic visualization of each user accessing the network resource. As shown, for example in FIG. 2, each user is graphically represented in the visualization with an indicium, such as a point or dot. The visualization (and thus, the position of each indicium representing a user) is dynamically updated as each user accesses data files, such as web pages, from the network resource and thus, moves from state to state (or page to page) over time. The effect is similar to watching cars move along a complex highway system. In some embodiments, the visualization may be generated in real-time or near real-time (referred to collectively herein as "real-time") as the data upon which the visualization is generated is received. In such embodiments, the data is typically live data as opposed to historical data. In other embodiments, the visualization may be generated off-line, with a delay instituted after receiving the data or based on historical data. The visualization generated by the visualization service may include many users, individually represented with indicium, transitioning from one state to the next, illustrating the user's behavioral interaction with the network resource. Focusing on an individual user's behavior as the user accesses different data files from the network resource enables a viewer to observe a particular user's experience with the network resource, while at the same time comparing that user to the rest of the users that are also accessing the network resource. This graphical representation of user traffic enables the viewer to see patterns in user behavior as well as abnormalities that may be affecting the performance of the network resource.

The graphical representation generated by the visualization service may be applicable to any network resource and in a variety of environments. For example, the graphical representation may provide a work flow analysis of users accessing a network resource providing an electronic photo album sharing application; whereby the users sign in, create a new album name, upload photos to the new album, edit/organize their photos, send a link to the photos to their friends/family, and log-out of the application. As another example, the graphical representation may provide a work flow analysis of users accessing an email application; whereby the users sign in, review their inbox, review their calendar, compose a new e-mail, and log-out of the email application. In another embodiment, the graphical representation may provide for an item flow analysis of physical objects moving to different physical locations. For example, the physical objects may be items in a warehouse or letters in a postal system.

In other embodiments, the visualization service generates statistical data relating to a path that each user follows as he or she accesses different files from the network resource. For example, in an electronic commerce ("ecommerce") environment, a user's path may include accessing: (1) a Sign In page, (2) a Product Review page, (3) a Checkout page, and (4) a Payment page. Statistical data may be gathered during a user's traversal of such a path through the different files of the network resource and can include a variety of attributes associated with the user or the user's behavior. Accordingly, the visualization service may filter or highlight the graphical representation based on at least one attribute.

In yet other embodiments, the various states traversed by a user may be organized into a hierarchical structure. Accordingly, the graphical representation generated by the visualization service may be, upon selection, expanded or contracted to show the behavior of users at higher or lower state levels within the network resource. While the visualization service is described below as visualizing the behavior of users, e.g., accessing a network resource, the visualization service may also be used to visualize the behavior of any animate or inanimate object that is capable of transitioning between states. Nonlimiting examples of such objects may include packages, containers, items of inventory, etc. In addition, while the visualization service is described as visualizing the behavior of user transitioning among one or more states associated with a network resource, the visualization service may also be used to visualize the behavior of objects among one or more states associated with one or more physical locations, e.g., an item of inventory transitioning through a fulfillment center and/or being shipped to an address. The visualization service may also be used to visualize the behavior of objects among one or more states associated with a condition of the object, e.g., the condition of a perishable good, or the status conditions of network resource. In yet other embodiments the visualization service may be used to visualize the behavior of objects among mixed states, e.g., physical states and conditions states.

FIG. 1 is an illustrative graphical representation or visualization 105 generated by a visualization service of the behavior of a small sample of users (e.g., users 150, 155 and 160) accessing a network resource. More specifically, as users access various files (e.g., web pages) from the network resource, the visualization service updates the graphical representation to depict the access of the user of one file after another. Thus, each file accessed by the user from the network resource can be referred to as a "state" to which the user transitions or traverses a path. In one embodiment, each user is graphically represented in the visualization 105 with a visual user indicium such as a dot or point, while each file the user accesses (or state to which the user transitions) is graphically represented by a state indicium, such as a circle, oval or square. In another embodiment, a user indicium and/or a state indicium may be an aural indicium such as a tone or series of tones. Those skilled in the art will appreciate that any type, shape, size, color, prominence, etc. of visual indicia and any type, volume, etc. of aural indicia, or any combination of the foregoing may be used to represent a user and/or a state within a visualization without departing from the scope of the present disclosure.

In the illustrated example, each user 150, 155 and 160 is graphically represented in the visualization 105 as a dot, while each state to which a user may transition in the network resource is represented as an oval. In addition, the network resource in the illustrated example is a retail website from which a user may browse, select, and purchase items offered for sale. Accordingly, the visualization 105 includes a plurality of states associated with a retail website, such as a Sign In state 110, an Address Select state 115, a Shipping Select state 120, a Payment Select state 125, a Single Page Checkout state 130, a Thank You Page state 135, and an Abandon state 140. However, those skilled in the art will recognize that the example illustrated in FIG. 1 is used for purposes of discussion, and thus, should not be construed as limiting.

FIG. 1 illustrates the behaviors of three users 150, 155, and 160 as they proceed from the Sign In state 110 to their respective final destination state. As illustrated in FIG. 1, the three users 150, 155, and 160 traverse different paths between states, as indicated by arrows associated with each user's indicium. However, those skilled in the art will appreciate that since the visualization 105 is typically generated dynamically, the user indicia will appear as moving along a path from one state to another. For example, as user 150 spends time accessing the Sign In page for the network resource, the user 150 is dynamically displayed as looping around the Sign In state 110, as illustrated statically in FIG. 1 by user indicia 150A to 150F and the associated arrows. After spending some time accessing the Sign In page, the user 150 is dynamically displayed as traversing a path to the Single Page Checkout state 130, as shown by user indicia 150G to 150M and associated arrows, presumably to complete a purchase. The user 150 then traverses a path to the Thank You Page state 135, as illustrated by the movement of user indicia 150N to 150P and associated arrows. Accordingly, the user 150 accesses a Thank You page from the network resource which thanks the user for completing the purchase.

As another illustration of a user traversing an alternative path, the user 155 begins at the Sign In state 110, and then transitions to the Address Select state 115, as illustrated by the movement of user indicia 155A to 155B. Once the user 155 has selected an address for shipping a purchase from an Address Selection page provided by the network resource, the user traverses a path to the Shipping Select state 120, as illustrated by the movement of user indicia 155C to 155D. However, rather than continuing on to complete a purchase after accessing a Shipping Selection page to select a shipping method desired by the user (e.g., express, standard, etc.), the user exits the network resource. Accordingly, the user 155 traverses a path to the Abandon state 140, as illustrated by the movement of user indicia 155E to 155F. If the transition to the Abandon state 140 is not expected, the visualization 105 may then provide the user with an indication that an issue exists with network resource performance at the Shipping Select state 120.

In contrast, user 160 begins at the Sign In state 110 and then traverses a path to the Address Select state 115, as illustrated by the movement of user indicia 160A to 160B. The user 160 then traverses a path to the Shipping Select state 120, as illustrated by the movement of user indicia 160C to 160D.

After the user 160 has selected a shipping method, the user 160 traverses a path to the Payment Select state 125, as illustrated by the movement from of user indicia 160E to 160F. Upon access of a Payment Selection page from the network resource, the user may select the desired method of payment for a purchase. Once the payment method is selected, the user 160 traverses a path to the Single Page Checkout state 130, as illustrated by the movement of user indicia 160G to 160H, to complete the purchase from a Checkout page. Upon completion of the purchase, the user 160 traverses a path to the Thank You Page state 135, as illustrated by the movement of user indicia 160I to 160J.

The velocity at which the user indicia for users 150, 155, and 160 move between states during dynamic visualization may be fixed or adjustable. For example, the user indicia for users that are transitioning more quickly from one state to another are shown as moving at higher velocities between states than the user indicia for users who are not quickly accessing different files from the network resource. Accordingly, the relative velocities at which different user indicia traverse the same path may reveal additional pertinent information regarding the user and/or the network resource. In one embodiment, a viewer may configure the visualization service to speed or slow the velocity at which the user indicia move from one state to another. In some embodiments the velocity at which a user indicium transitions between states is determined based on the times at which the user accessed the corresponding states.

As depicted in FIG. 1, the users 150, 155, and 160 may transition directly from one state to another during visualization. However, a user may also remain in a particular state for several expected or unexpected reasons. For example, as depicted in FIG. 1, user 150 is graphically represented as looping around the Sign In state 110 while accessing a Sign In page from the network resource. One reason for this behavior may be that user 150 forgot his/her password and was presented with the same Sign In page for re-input, therefore creating a loop representation within the visualization 105. An alternative reason for this behavior may be that user 150 encountered an error on the Sign In page or does not know how to properly access the network resource using the Sign In page, e.g., due to unclear instructions, confusing layout, etc. If a statistically significant number of users are shown to be looping around a particular state, it may indicate an issue with the performance of the page or the network resource at this particular state. Accordingly, this may lead a provider of the network resource to review the page at issue to ensure that the page is operating properly and/or to make improvements to the page and/or the network resource. If the same user is shown to be looping around a particular state, it may indicate that the user is in need of assistance. Accordingly, this may lead a provider of the network resource to offer assistance to the user, e.g., through electronic messaging (via electronic mail message, text message, pop-up window, etc.), voice messaging, etc. In some embodiments, such messages may include a selectable control, such as a "click to call" button or an embedded hyperlink, that would initiate or otherwise facilitate interaction between, for example, a customer service representative for the network resource and the user. Such interaction may be initiated using a voice over IP ("VOIP") communication link with the user.

As depicted in FIG. 1 with the use of hash marks, the visualization 105 may utilize markings or color in order to differentiate between different users 150, 155, and 160, different states, different paths of users among states, etc. Moreover, color may be applied in the visualization 105 to indicate attributes related to either states or users. Accordingly, in one embodiment, color is utilized to highlight different user paths. Thus, the color green may be used to represent paths that lead to the Thank You state 135, whereas the color red may be applied to signify paths that lead to the Abandon state 140. In yet another embodiment, color may be utilized in order to differentiate between different states. For example, the Sign In state 110 may be indicated in blue, while the Address Select state 115 may be indicated in green. In yet another embodiment, color may be utilized in the visualization 105 in order to represent the paths of users suspected in conducting fraudulent transactions. In yet another embodiment a path may be highlighted if an anomaly is detected in association with the network resource. In such cases, the highlight may be, for example, a visual notification displayed to the user in proximity to the state and/or user indicia to which it applies or an aural notification output to the user.

Figure 2:
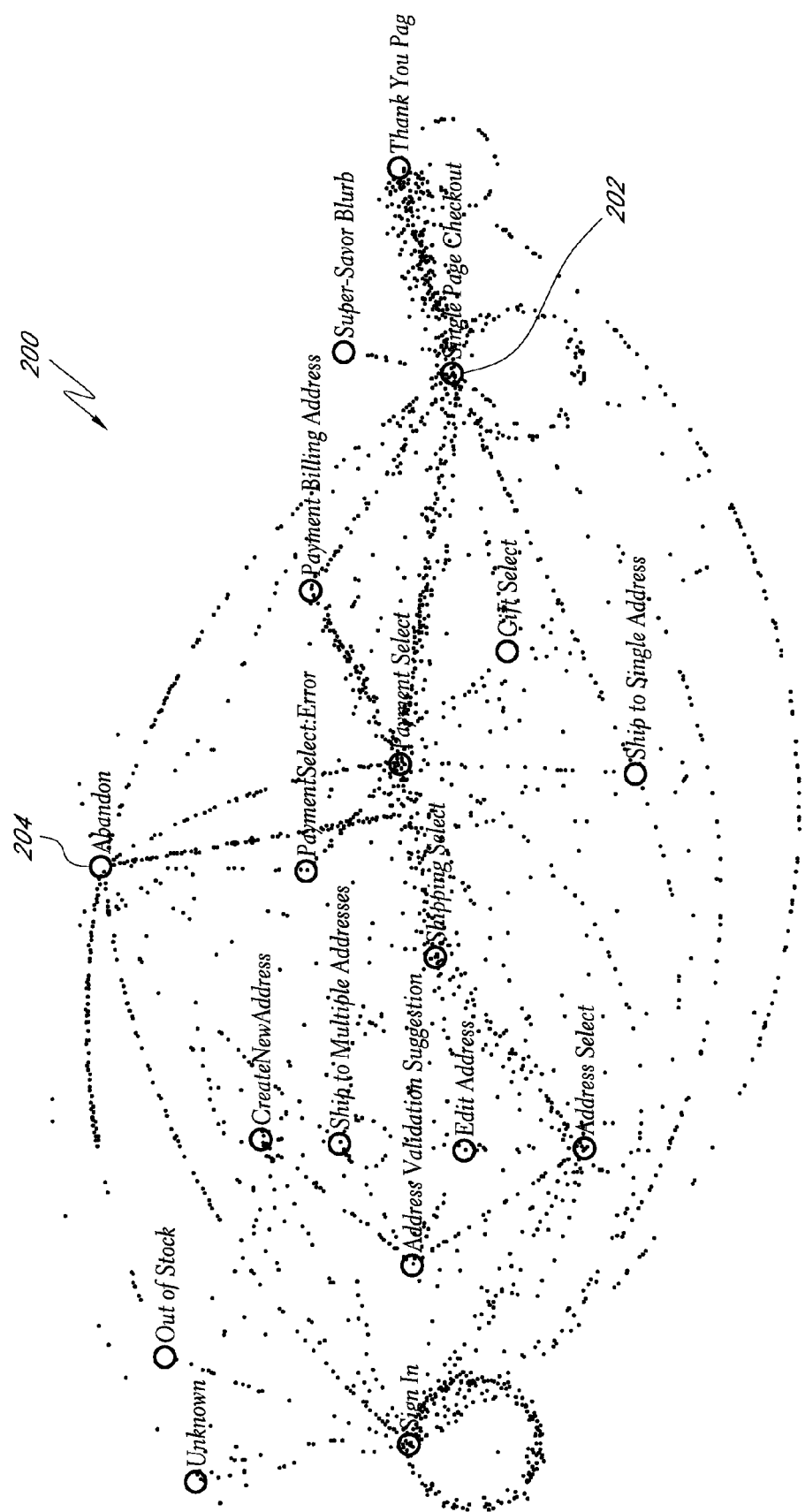
FIG. 2 is an illustrative graphical representation or visualization of the behavior of a large sample of users accessing a network resource.

FIG. 2 is a "snapshot" of an illustrative visualization 200 of the behavior of a large sample of users accessing a network resource. Each user is represented in FIG. 2 by a user indicium, such as a dot or point. Accordingly, the visualization 200 graphically represents a large number of users transitioning from one state to the next within the network resource at a particular point in time. However, those skilled in the art will appreciate that since the visualization 200 is typically generated dynamically, the user indicia will appear in the visualization 200 as moving along a path from one state to another over time at different velocities according to, e.g., the speed at which each user is transitioning from one state to another. For example, in one embodiment, the visualization 200 graphically represents users remaining at a particular state as looping back to the same state and users transitioning from one state to another as or traversing an arced path to the next state. However, any type or style of display mechanism may be implemented to visually depict user behavior without departing from the scope of the present disclosure.

As can be seen from FIG. 2, the visualization 200 generated by the visualization service can reveal patterns in user behavior as well as abnormalities that may be affecting the performance of the network resource. For example, given the large number and density of users looping around the Single Page Checkout state 202 and then traversing a path to the Abandon state 204, it may be possible that users are experiencing difficulty completing a purchase at the Single Page Checkout page and are thus, exiting the network resource. For the provider of the network resource (i.e., an electronic commerce website in the illustrated example), such user behavior is of concern as it indicates possible lost sales due to a potential issue related to the Single Page Checkout page. A resulting investigation may reveal, for example, an operational error on the Single Page Checkout page that prohibits users from completing purchase. Corrective action may then be taken, thus improving the performance of the page and/or the network resource.

Figure 3:
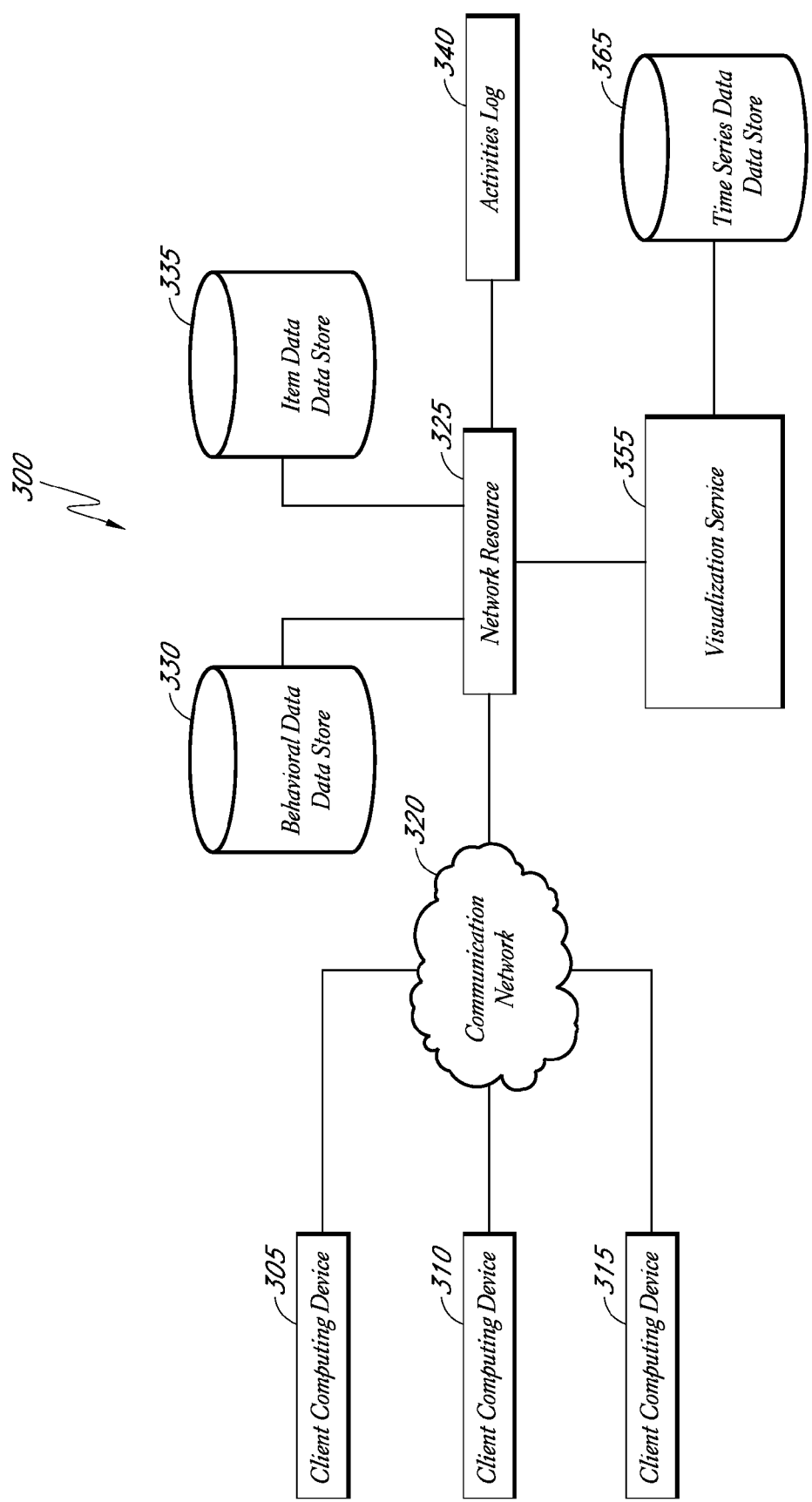
FIG. 3 is a block diagram depicting an illustrative networked environment in which a visualization service generates graphical representations of the behavior of users accessing a network resource such as the graphical representations depicted in FIGS. 1 and 2.

FIG. 3 is a block diagram depicting an illustrative networked environment 300 in which a visualization service 355 generates graphical representations or visualizations of the behavior of users accessing a network resource such as that depicted in FIG. 2. The illustrative networked environment 300 of FIG. 3 includes one or more client computing devices 305, 310, and 315. The computing devices may be laptop or tablet computers, personal computers, personal digital assistants (PDAs), hybrid PDA/mobile phones, mobile phones, electronic book readers, workstations, and the like. In one embodiment, the client computing devices 305, 310, and 315 communicate via a communication network 320, such as the Internet, with a network resource 325 (e.g., a website used to conduct electronic shopping). The communication network 320 may be a wired and/or wireless communication network, a cable network, a local area network (LAN), a wide area network (WAN), a collection of networks such as the Internet, etc. Because protocols for network communications such as TCP/IP are well-known to those skilled in the art of computer networks, further description of these protocols and other methods/devices used to implement the communication network 320 are not provided herein.

The network resource 325 may be a group of related documents and associated files, scripts, and data stores that is provided by a server in response to requests from one or more client computing devices 305, 310, and 315, each executing a browser or other navigation application or tool. In some embodiments, the data is served to the client computing devices in the form of one or more web pages. A web page may consist of an HTML file, with associated files for graphics, scripts, etc., in a particular directory on a particular server (and thus, the file is identifiable by a Uniform Resource Identifier ("URI")). Usually a web page includes links to other web pages and/or objects (e.g., scripts, content, images, etc.). In one embodiment, the client computing devices 305, 310, and 315 utilize the communication network 320 to access files or web pages from the network resource 325. Such time-stamped user activity data may be logged by an activities log 340 in communication with the network resource 325 in order to provide a session history that can be used to analyze user behavior and/or diagnose network resource issues. Activities log data may then be provided to the visualization service 355, which may parse and model the data to generate a visualization, such as those described above, of the users' access of the network resource 325. In another embodiment, at least one client computing device 310 is a thin client executing, e.g., only a browser, in order to communicate with the network resource 325. In such cases, the network resource 325 may include server side scripting language or programs to capture user activity data and transmit such data to the visualization service 355 in order to generate a visualization such as that shown in FIG. 2.

In addition to the activities log 340, additional user behavioral data, such as time-stamped user browse histories and user purchase histories, may be stored in a data store 330 of behavioral data accessible by the network resource 325. As illustrated in FIG. 3, the networked resource 325 maintains time-stamped item browse histories and purchase histories of users in a behavioral data data-store 330. In one embodiment, a user browse history identifies items selected by the user for viewing, and indicates the date and time such items were viewed by the user. A user purchase history may identify all of the items purchased by the user, together with an associated dataset of purchase information. The item browse and purchase histories of the user may be maintained in any suitable format (log, database, event history dataset, etc.), and may be stored separately from each other and from other types of user activity data. In one embodiment, the behavioral data data store 330 may include data obtained from external sources. For example, user activity data may additionally be acquired from third party network resources, and/or from browser toolbars (not shown) that report user browsing activities. Like activities log data, the user behavioral data may be provided to the visualization service 355, which may parse and model the data to generate a visualization, such as those described above, of the users' access of the network resource 325.

In the illustrated embodiment, the network resource 325 provides users access to catalog information related to items that may be browsed and/or purchased, which catalog information may be stored in an item data store 335. The items may include consumer electronics products, household appliances; books, music and video titles in physical or downloadable form, magazine, and other subscriptions, etc., and may be arranged within a hierarchy of categories to facilitate browsing of the catalog. Accordingly, many different items may be represented in the item data store 335.

As also shown in FIG. 3, the networked environment 300 also includes a visualization service 355 that may acquire data from the activities log 340, the behavioral data data store 330, and other sources, such as JavaScript (not shown) embedded on a thin client computing device, in order to generate a visualization of user behavioral data. The process of aggregating data from a plurality of sources may be done dynamically, without disturbing normal operations (e.g., "on the fly") or in an off-line process. The visualization service 355 may aggregate extremely large data sets relating to network resource traffic and produce a visualization of user behavioral data that enables a viewer to identify information and/or conditions relevant to network resource performance or user need. The visualization service 355 may store the aggregated data in a data store 365 of time series data described in more detail below.

The networked environment 300 depicted in FIG. 3 is illustrated as a distributed computer environment including several computer systems that are interconnected using one or more computer networks. However, it will be appreciated by those skilled in the art that the networked environment 300 could have fewer or greater components than are illustrated in FIG. 3. For example, the networked environment 300 could include various web services components and/or peer-to-peer network configurations. Thus, the depiction of the networked environment in FIG. 3 should be taken as illustrative and not limiting to the present disclosure.

Figure 4:
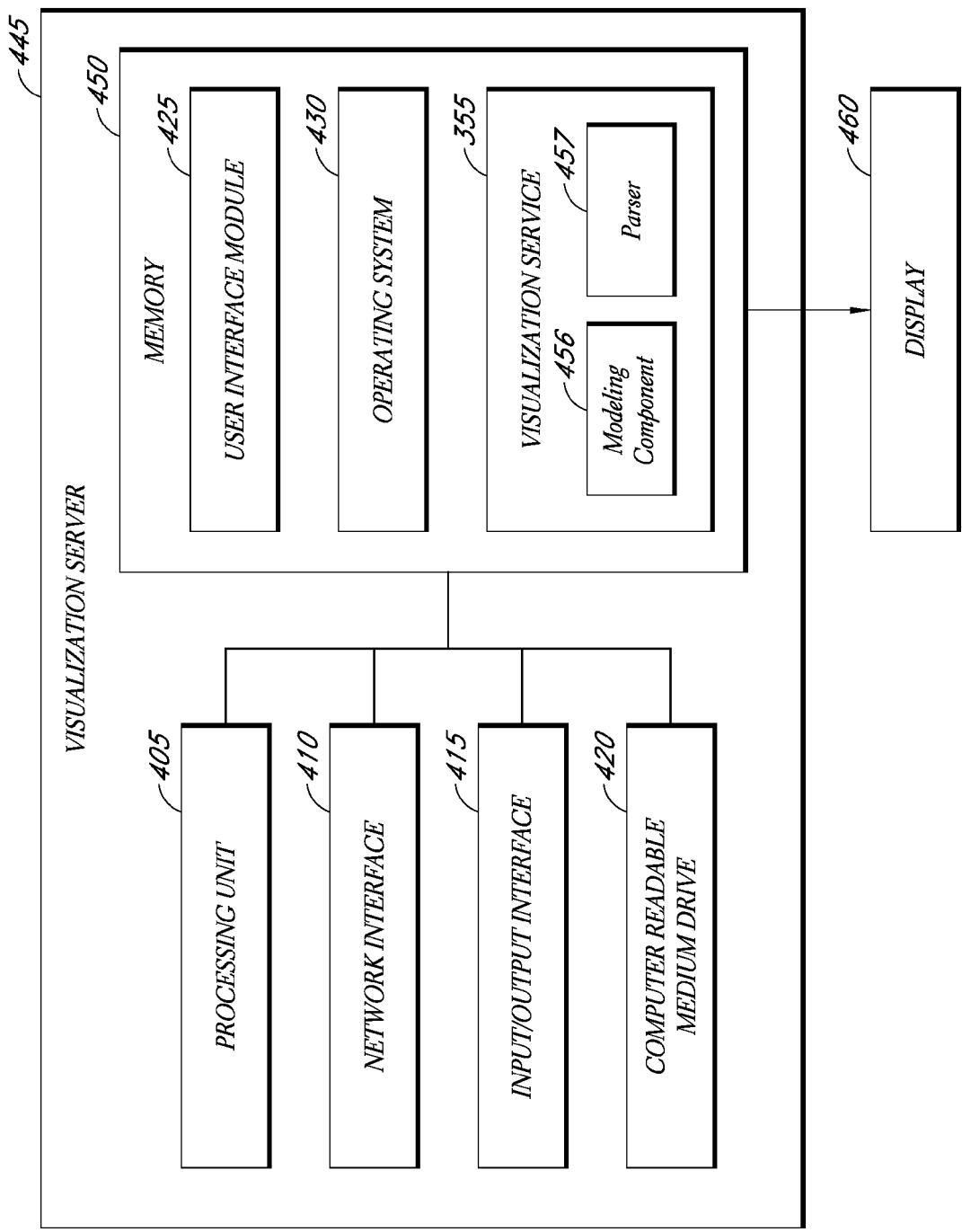
FIG. 4 is a block diagram of a general architecture of a visualization server suitable for use in the networked environment depicted in FIG. 3 and for carrying out aspects of the visualization service.

FIG. 4 is a block diagram of a general architecture of a visualization server 445 suitable for implementing a visualization service 355. While the visualization service 355, as illustrated in FIG. 4, is depicted as implemented by a single computing device (i.e., visualization server 445), this is illustrative only. In an actual embodiment, the visualization service 355 may be embodied in a plurality of visualization servers 445, each executing an instance of the visualization service.

The general architecture of the visualization server 445 depicted in FIG. 4 includes an arrangement of computer hardware and software components that may be used to implement the visualization service 355. Those skilled in the art will appreciate that the visualization server 445 may include many more (or fewer) components than those shown in FIG. 4. It is not necessary, however, that all of these generally conventional components be shown in order to provide an enabling disclosure. As illustrated in FIG. 4, the visualization server 445 includes a network interface 410, a processing unit 405, an input/output interface 415, and a computer readable medium drive 420, all of which may communicate with one another by way of a communication bus. The network interface 410 may provide connectivity to the communication network 320 and/or other networks or computing systems. The processing unit 405 may thus receive information and instructions from other computing systems such as client computing devices 305, 310, and 315 via the communication network 320. The processing unit 405 may also communicate to and from a memory 450. The input/output device interface 415 may accept input from device such as a keyboard, mouse, digital pen, etc (not shown).

The memory 450 contains computer program instructions that the processing unit 405 executes in order to operate the visualization service 355. The memory generally includes RAM, ROM, and/or other persistent memory. The memory 450 may store an operating system 430 that provides computer program instructions for use by the processing unit 405 in the general administration and operation of the visualization server 345. The memory 450 may further include computer program instructions and other information for implementing features of the visualization service 355. For example, in one embodiment, the memory 450 includes a user interface module 425 that generates user interfaces (and/or instructions therefor) including the visualizations such as those depicted in FIG. 2.

In addition, the memory 450 contains computer program instructions for implementing the visualization service 355, which instructions are discussed in more detail below in connection with FIG. 6 and FIG. 7. As illustrated in FIG. 4, the visualization service 355 may include a parser component 457 and a modeling component 456. The parser 457 may be configured to parse user behavioral data received from the network resource 325 and generate a path record for each user that describes the path traversed by the user within the network resource 325. More specifically, the parser 457 may reconstruct the path traversed by the user within the network resource 325 based on session data obtained, for example, from the activities log 340 or the behavioral data data store 330. In addition, the parser 457 may be configured to preprocess the user behavioral data received from the network resource 325 to remove redundant or irrelevant information and sort/organize the remaining data. The modeling component 456 may be configured to read the path records preprocessed by the parser 457 and generate a visualization of the user's behavior over time while accessing the network resource 325.

The visualization server 345 may optionally be connected to a display 360 to render the graphical representations or visualizations generated by the visualization service 355. The visualization service 355 may also provide visualizations to external devices by means of, for example, a web services interface. In one embodiment, a web service interface permits an external device the ability to establish a communication connection with an analytics service provider. The analytics service provider may request access or receipt of user behavioral data form the external device and/or other sources in order to generate a graphical representation and provide it to the external device. In another embodiment, the web services interface may permit an external device to transfer or upload a file and receive a graphical representation of the data within the transferred or uploaded file. In one embodiment, the graphical representation provided to the client device may be a multimedia file that is transmitted to the external device. As those skilled in the art will appreciate, the multimedia file may be downloaded or streamed to the external device.

Figure 5:
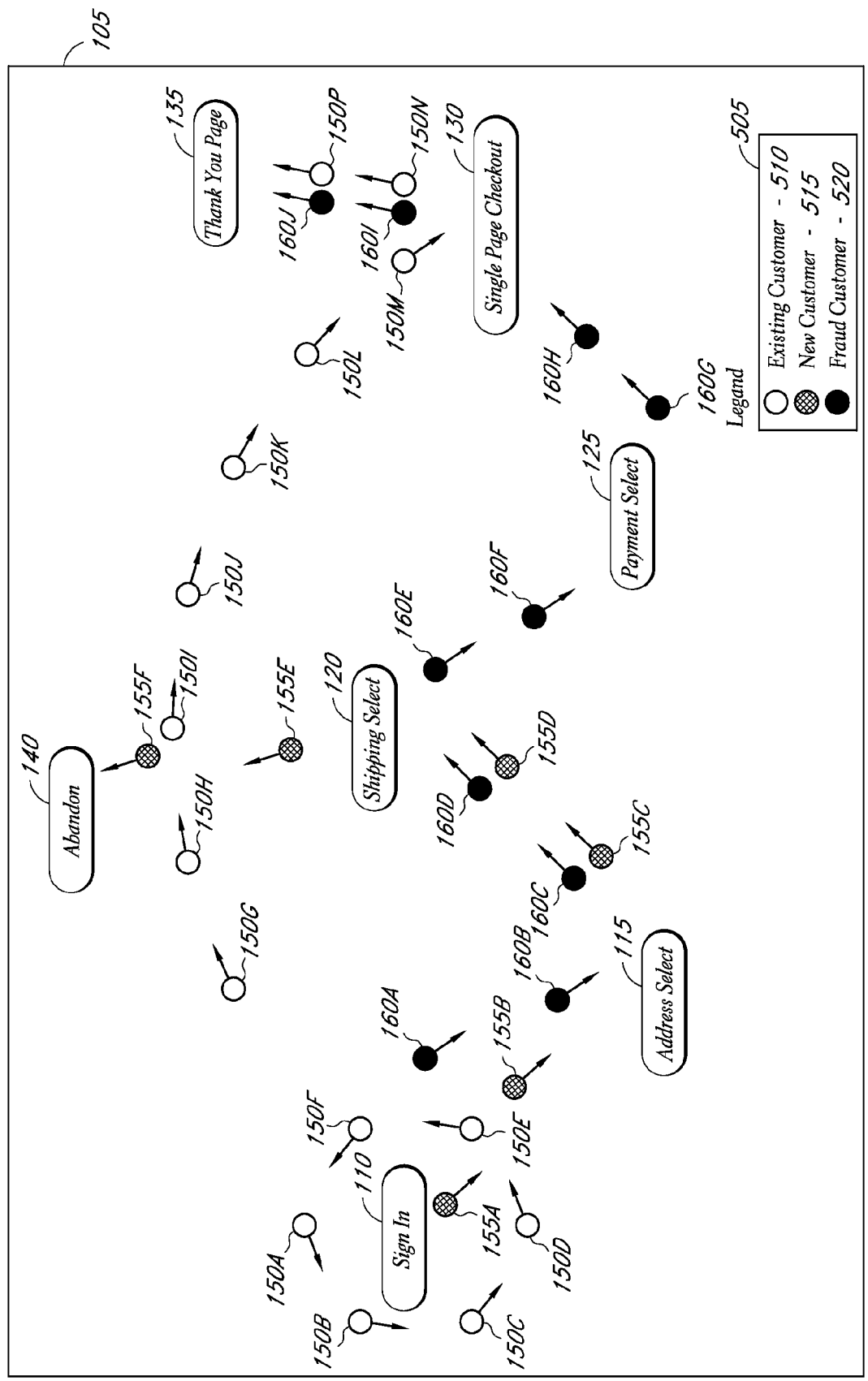
FIG. 5 is an illustrative graphical representation or visualization of the behavior of a small sample of users accessing the network resource in which different attributes of users or users' behavior are highlighted.

FIG. 5 is an illustrative graphical representation or visualization of the behavior of a small sample of users accessing the network resource 325 in which different attributes of users or user behavior are highlighted. Similar to FIG. 1, FIG. 5 illustrates the behavior of three users 150, 155 and 160 as they traverse different paths among a Sign In state 110, an Address Select state 115, etc. of the network resource 325. As depicted in FIG. 5, the user indicia for users 150, 155, and 160 are represented using different hash marks. In one embodiment, a viewer or system administrator selects the highlight (e.g., hash marks, color, prominence, etc.) to be applied to the user/user indicia in order to gain more insight from the graphical representation. For example, as depicted in the legend 505 of FIG. 5, user 150 is identified as an "existing customer" 510, and thus, the corresponding user indicia (e.g., user indicia 150A-P) are a clear dot; user 155 is identified as a "new customer" 515, and thus, the corresponding user indicia (e.g., user indicia 155A-155F) are a cross-hatched dot; and user 160 is identified as a "fraud customer" 520, and thus, the corresponding user indicia (e.g., user indicia 160A-160J) are a solid dot. Thus, the paths followed by "existing customers" 510 may be compared to the paths followed by "new customers" 515, for example, in order to the compare the differences in behaviors among such users.

In one embodiment, highlighting of user indicia within a graphical representation is based upon attributes associated with each user. For example, an attribute may be related to the user, e.g., it may describe the user's behavior or an aspect of the user, anything related to the user or user's behavior, or anything that can be correlated to the user or user's behavior. Non-limiting illustrative examples of attributes associated with a user or a user's behavior may include type of user, age of user, prior purchase amount for user, purchase total for user, type of credit card selected by user, etc. The visualization service 355 may highlight attributes of users using different methods, such as use of different colors, shapes, prominence, sizes, etc. in order to reveal desired information or trends. For example, paths of users making "high value purchases" may be displayed more prominently than paths of users making "low value purchases."

The visualization service 355 may also filter the user behavioral data upon which the visualization is generated based on a specific attribute. For example, the visualization service 355 may filter the user behavioral data based on type of customer and thus isolate only the paths traversed by "new customers" 515 for display in the visualization. In yet another example, the visualization service 355 may filter the user behavioral data based on age of customer, and thus only display (or display in a different color, for example) the paths traversed by users between the ages of 18 and 25 in the visualization. Those skilled in the art will appreciate that one or more attributes may be selected for the purposes of filtering and that the one or more attributes may be selected manually (e.g., by the viewer or a system administrator) or automatically (e.g., by default).

As noted above, user behavioral data received from the network resource 325 by the visualization service 355 may be used to generate a path record for each user that describes the path traversed by the user within the network resource 325. Such path records may include a user identifier or "object ID," time and state pairs for each state visited by the user, and optionally, the attributes associated with each user or the user's behavior. FIG. 6 is a flow diagram of an illustrative routine implemented by the visualization service 355 to generate path records based on user behavioral data. The process begins at block 605, where the visualization service 355 receives user behavioral data from the network resource 325. In one embodiment, the behavioral data may be obtained from one or more of the activities log 340, the behavior data data store 330, executable programs (not shown) embedded in one of the client computing devices 305, 310, or 315, etc.

At block 610, the behavioral data received is sorted by the object ID for each user. Next, at block 615, the sorted data is parsed in order to select a current object ID for a user. In one embodiment, the sorted data is parsed and the current object ID is selected by the parser component 457 of the visualization service 355. At decision block 620, the visualization service 355 determines if a path record exists for the current object ID by parsing the sorted data to identify a path record associated with the current object ID.

At block 625, if a path record does not exist for the object ID, then a path record is created. In one embodiment, the path record may be created from the data obtained from the network resource 325. Such data may include, for example, log entries, each of which indicates a file accessed by the user from the network resource (i.e., a state) and a time at which the user accessed the file. More specifically, the data received by the visualization service 355 may include one or more tuples sorted by timestamp, each tuple including an object ID, timestamp, and state. As noted above, a "state" may represent the file that was accessed by the user having the object ID at a specific point in time. The tuples are then aggregated into the following data per object ID: [object ID; time(1), state(1); time(2), state(2); . . . time(n), state(n)]. This aggregation of data is referred to as a "path record" and identifies the files that a particular user accesses over time (e.g., in a session). In some embodiments, path records may also include attributes associated with the user or the user's behavior as discussed above. Such a path record may be described as follows: [object ID; time(1), state(1); time(2), state(2); . . . time(n), state (n); . . . attribute(a); attribute(b); (attribute(c), . . . ]. At block 630, if a path record already exists for the object ID, the visualization service 355 appends a new time/state pair for the user to the existing path record for the object ID. Once created or appended, the path record is stored in the time series data data store 365 for further use by the visualization service 355.

Next, at decision block 640, the visualization service 355 determines if the user identified by the current object ID has reached an end state. In other words, the visualization service 355 determines if the user has ended his or her session with the network resource 325 (e.g., by exiting the network resource, timing out from the network resource, etc.). For example, in one embodiment, after a threshold time value (e.g., ten minutes) is exceeded, an abandon request is injected into the current path record to force an end state for a current object ID. Those skilled in the art will appreciate that the threshold time value applied by the visualization service 355 may be pre-set or it may be configured by the viewer or a system administrator. In another embodiment, a path record may indicate that the user identified by the current object ID has signed out of the network resource 325 and thus, reached an end state. In such cases, the path record is marked as closed at block 645. Closed path records may be discarded by the visualization service 355 once the visualization has advanced past the last entry in the path record.

Returning to decision block 640, if an end state has not yet been reached, the routine returns to block 630 and another new time and state pair (and perhaps one or more attributes) is appended to the path record for the current object ID. In some embodiments, after a threshold time value is exceeded, the visualization service 355 may choose to hold the current state of the current object ID and wait for more data to be received, rather than mark the path record as closed. In such cases, the routine may return to block 630 and append a new time and state pair to the path record once received.

Once the path record for the current user identified by the object ID is closed, the visualization service 355 selects the next object ID and returns to decision block 620 so that it may iterate through blocks 620 through 645 and build a path record for the next object ID.

Figure 6:
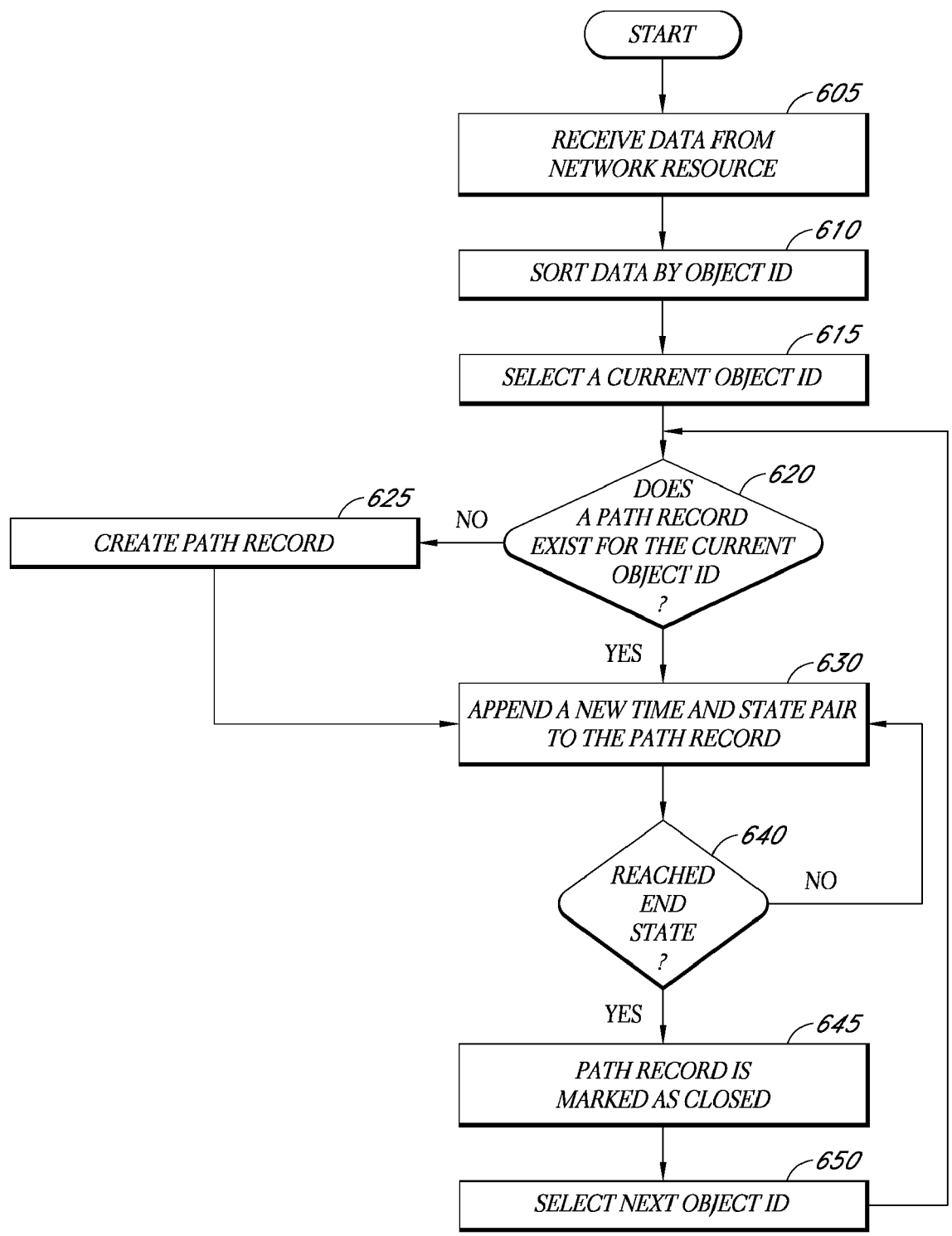
FIG. 6 is a flow diagram of an illustrative routine implemented by the visualization service to generate path records based on user behavioral data.
Figure 7:
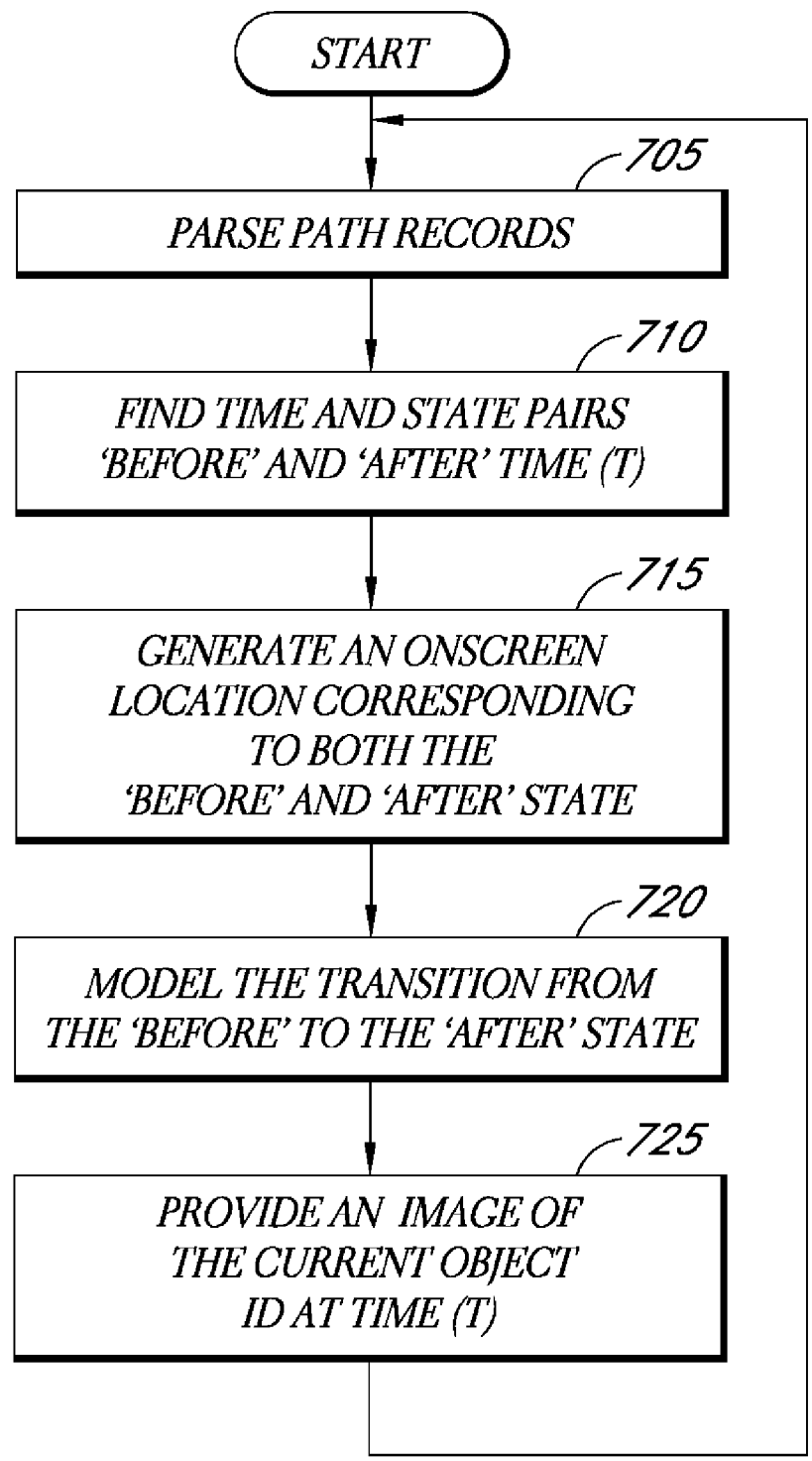
FIG. 7 is a flow diagram of an illustrative routine implemented by the visualization service to generate a graphical representation or visualization based on the path records.

FIG. 7 is a flow diagram of an illustrative routine implemented by the visualization service 355 to generate a graphical representation or visualization based on the path records generated by the routine implemented in FIG. 6. As will be described in more detail below, in one embodiment, the routine implements an iterative process to render the visualization at time (t). Accordingly, as (t) changes, so does the visualization.

The routine begins at block 705, where the visualization service 355 parses the path records stored in the time series data data store 365 for a current object ID. Next, at block 710, for each path record, the visualization service 355 finds the time and state pairs occurring "before" and "after" time (t). At block 715, the visualization service 355 generates an onscreen location for a state indicium corresponding to each identified "before" state and "after" state. More specifically, the visualization service 355 generates an X-Y coordinate on a pixel display at which a state indicium is to be displayed by the visualization service for each state in the path records found to occur before time (t) and for each state in the path records found to occur after time (t).

At block 720, the modeling component 456 of the visualization service 355 identifies a parametric equation that can be used to model the user's transition (i.e., the path traversed by the user) from the "before" state to the "after" state. The parametric equation can be either arbitrarily generated when needed, or preconfigured. In order to provide visual separation for distinct users traversing a path between the same states, a two dimensional parametric equation is applied in one embodiment to capture not only the offset of user indicia lengthwise along the path, but also the width across which the user indicia are displayed along the path. This is done so that user indicia do not substantially overlap in the visualization. Instead, the user indicia form a path in the visualization with a visual width. In one embodiment the parametric equations implemented by the visualization service 355 generate a line of user indicia or an arc of user indicia. However, those skilled in the art will appreciate that a variety of parametric and/or other equations can be used thus resulting in different styles of displaying the user indicia. In addition, in some embodiments, the viewer or a system administrator may configure the parametric equations, save them, and load them again for later use. Accordingly, this enables a viewer or system administrator to layout a particular visualization of interest for a particular network resource.

At block 725, the visualization service 355 uses the parametric equation identified in block 720, the visualization's current time and the "before" and "after" time (t), to determine the current onscreen location (e.g., an X-Y coordinate in a pixel display) for a user indicium associated with the user identified by the current object ID and display an image of the user indicium at this location. Blocks 705 through 725 are continuously repeated to provide an animated visualization where users appear to be dynamically traversing paths from one state to another, (e.g., as he user's indicium traverses the line or arc generated by the parametric equation from one state indicium to another state indicium).

In yet other embodiments, the visualization service 355 calculates a wide variety of statistics based on the path records stored in the time series data data store 365. For example, the statistics may be based on user traffic associated with a state, user traffic associated with a path between states, user traffic associated with a path from an originating state to a destination state, etc. The statistics may be absolute or relative, and in some embodiments the statistics may be based on attributes associated with users or users' behavior. Moreover, the statistics may be generated on the fly, during post-processing, or off-line (e.g., in connection with a data warehouse query). If statistics are computed on the fly, then the statistics calculated by the visualization service 355 may be displayed with the visualization. For example, the statistics may be displayed in proximity to a particular state or user included in the visualization. In yet another example, statistics related to a particular state can be displayed upon selection by the viewer of the corresponding state indicium in the visualization. In other embodiments, the visualization service 355 may generate reports that can be viewed off-line. Regardless of how the statistics are generated and/or presented, viewers may use the statistics to identify patterns in, or instances of, user behavior that may reflect an anomaly at a particular point in time. Such information may be useful in detecting faults, taking corrective action, reallocating resources, providing customer service, etc.

Figure 8:
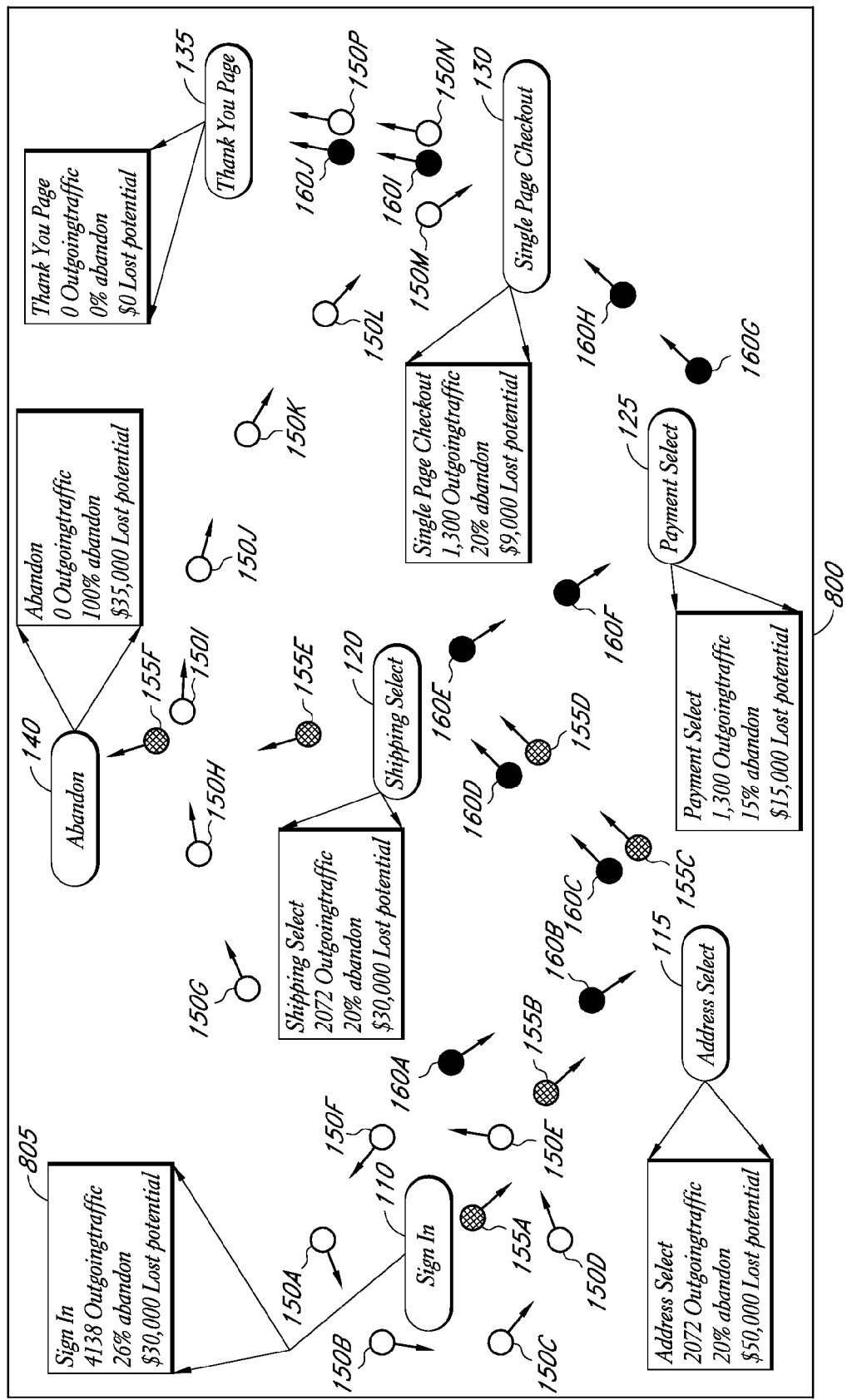
FIG. 8 is an illustrative graphical representation or visualization that includes state statistical data generated by the visualization service.

FIG. 8 is an illustrative graphical representation or visualization 800 of a small sample of users accessing the network resource 325. The visualization 800 includes statistical data generated by the visualization service 355 that is related to one or more of the states included in the visualization 800 (e.g., Sign In state 110, Address Select state 115, etc.). Accordingly, in the illustrated example, a statistical data layer, such as state statistics view bar 805, is associated with, and displayed in proximity to, each of the state indicia included in the visualization 800. However, in other examples, state statistic view bars may be displayed only for a subset of states or for those states individually selected by a viewer.

In the illustrated example, each state statistics view bar 805 includes statistics related to the corresponding state, such as the sum of outgoing users from the state, the percentage of users transitioning from the given state to the Abandon state 140, and the dollar sum of potential lost sales due to such abandonment. For example, state statistics view bar 805 includes the statistics of "4,138 outgoing traffic; 26% abandon; $30,000 lost potential." Those skilled in the art will appreciate, however, that a state statistics view bar may include any type of statistic that may be of possible interest to a viewer. Non-limiting examples of such statistics include "total hit count," "total page views," "bounce rate," "percent exit," "sum count," "sum revenue," "sum loss," etc.

Figure 9:
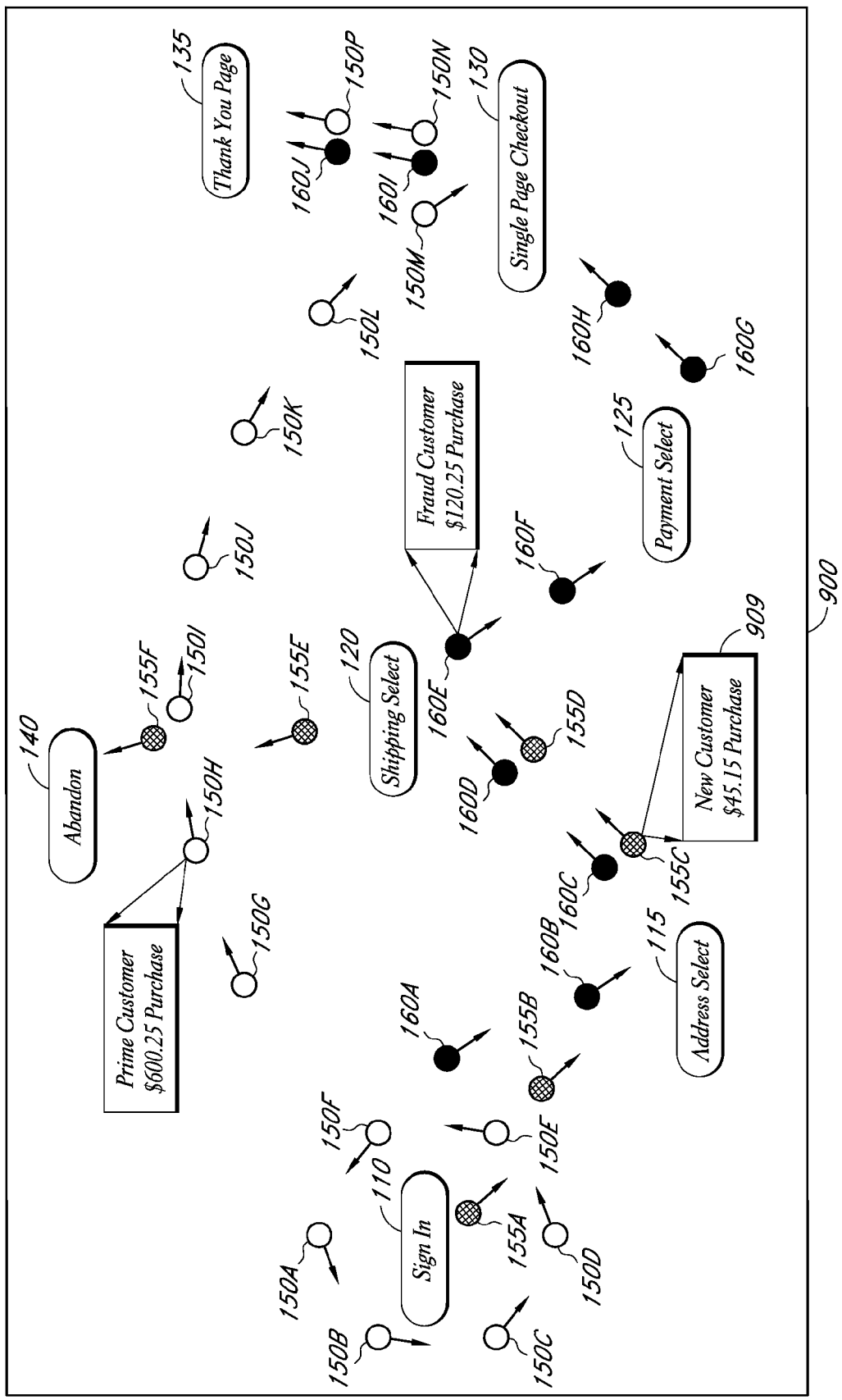
FIG. 9 is an illustrative graphical representation or visualization that includes user statistical data generated by the visualization service.

FIG. 9 is an illustrative graphical representation or visualization 900 of a small sample of users accessing the network resource 325. However, in this illustrated example, the visualization 900 includes statistical data generated by the visualization service 355 that is related to particular users represented in the visualization 900. Accordingly, in the illustrated example, a user statistics view bar is associated with, and displayed in proximity to, particular user indicia included in the visualization 900. For example, user statistics view bar 909 includes attributes and statistics related to user 155 at user indicia 155C, such as "New Customer; $45.15 Purchase Amount." Those skilled in the art will appreciate, however, that a user statistics view bar may include any type of statistic and/or attribute that may be of possible interest to a viewer. Non-limiting examples include "number of returns," "total year to date purchase amount," "average purchase amount," "session duration," "page view duration," "page views per session," etc.

Figure 10:
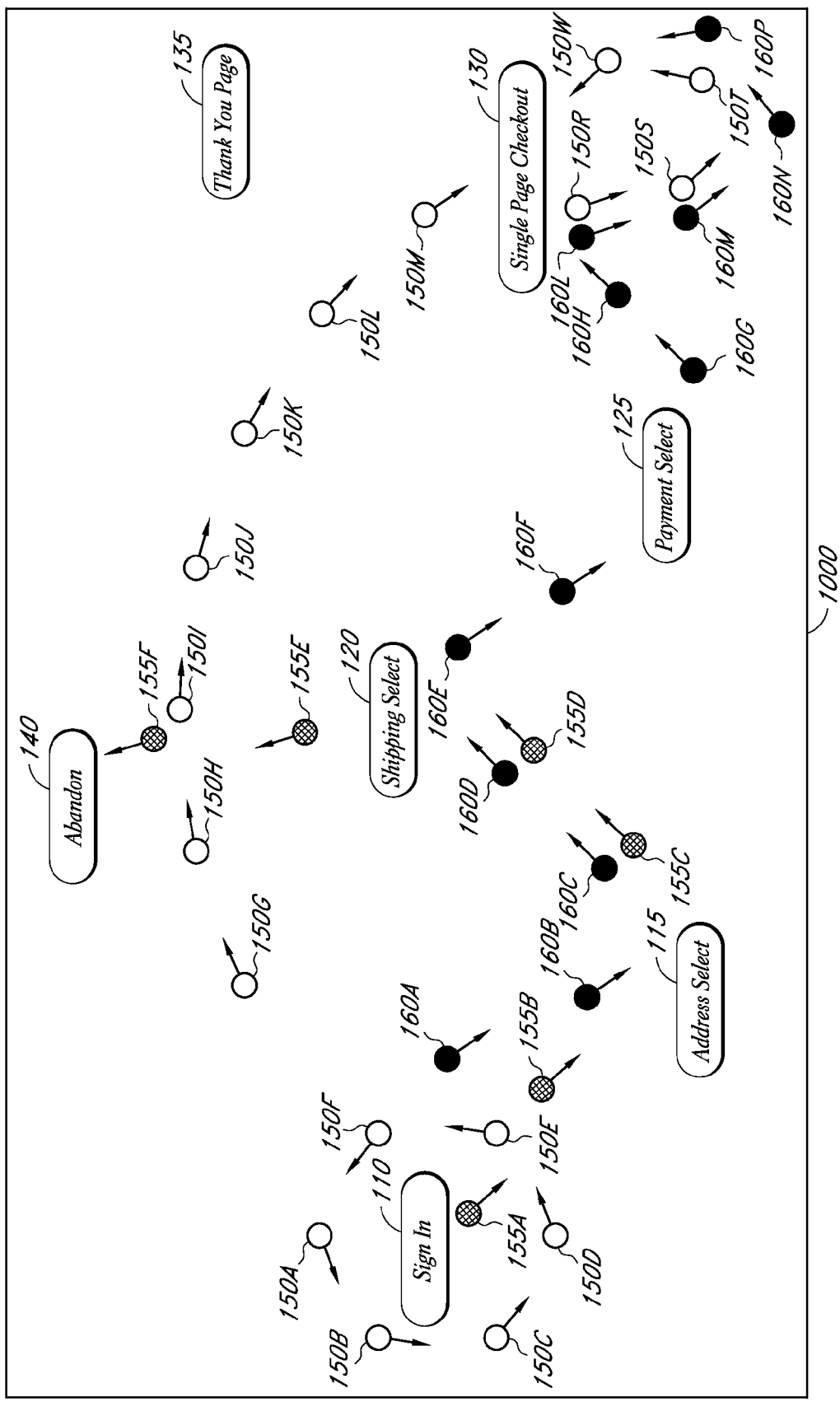
FIG. 10 is an illustrative graphical representation or visualization that reflects a possible fatal error in the network resource.

FIG. 10 is another illustrative graphical representation or visualization 1000 of a small sample of users accessing the network resource 325. However, in this illustrated example, visualization 1000 reflects a possible fatal error in the network resource 325. The visualization 1000 includes similar states to those found in visualization 105 (e.g., Sign In state 110, Address Select state 115, etc.) and includes user indicia for three users 150, 155, and 160 as they proceed from the Sign In state 110 to their respective final destinations.

As depicted in FIG. 10, users 150 and 160 remain at the Single Page Checkout state 130 as indicated by their respective user indicia 150R-150W and 160L-160P looping around the Single Page Checkout state 130. One possible reason for this looping is that users 150 and 160 are refreshing their respective Single Page Checkout web pages after a modification in their order. However, another possible reason for this looping is that a serious usability issue or systemic error has occurred that prevents the users 150 and 160 from transitioning to the Thank You page state 135, as desired. In such cases, a fatal error may be determined to have occurred in the system. Accordingly, the visualization service 355 may be used to provide insight to identify errors or bottlenecks from an operational standpoint. Also, the visualization service 355 may automatically detect and report abnormalities, areas of interest or out of the ordinary data to a viewer. In one embodiment, the visualization service 355 may provide a warning or an alert to a viewer in an event of a fatal error or abnormalities within a visualization. In other embodiments, the visualization service 355 may produce reports that detail the severity or explanation for the fatal error which in turn provides guidance on reallocation of operational resources to alleviate unexpected or undesirable interruptions and restore the expected operations of the system.

Figure 11:
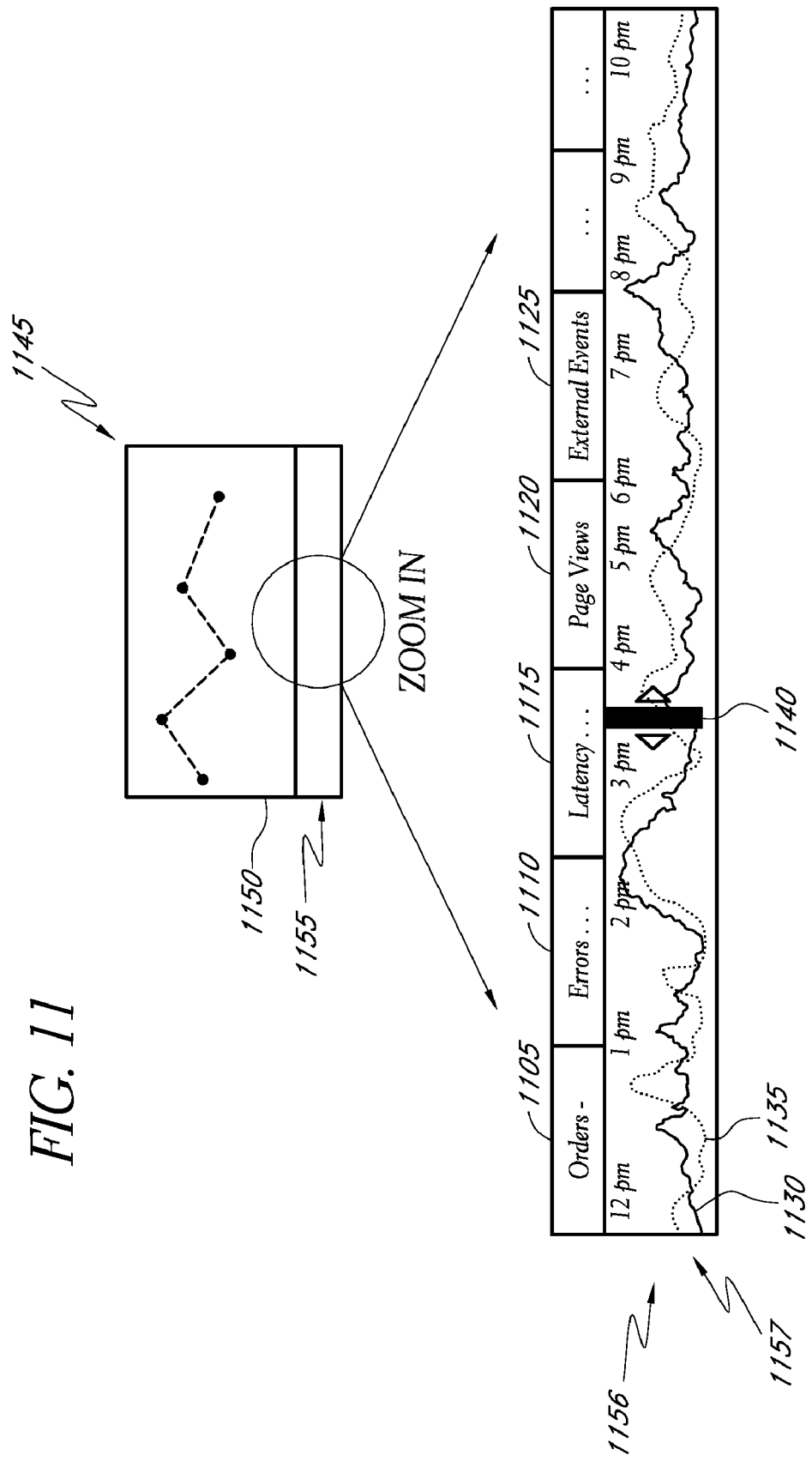
FIG. 11 is a pictorial diagram of a user interface tool known as a "scrubber bar" that enables selection and display of operational metrics for the network resource that are generated by the visualization service.

FIG. 11 is a pictorial diagram of a user interface tool that enables selection and display of operational metrics for the network resource that are generated by the visualization service 355. In the illustrated embodiment, the visualization service 355 generates a split screen display 1145 having a visualization display 1150 and a metrics bar display 1155. The metrics bar display 1155 is shown in detail in FIG. 11 as a detail metrics bar display 1156. In one embodiment, the detail metrics bar display 1156 includes multiple metrics controls, such as, an orders metrics control 1105, an errors metrics control 1110, a latency metrics control 1115, a page views metrics control 1120, an external events metrics control 1125, etc. Those skilled in the art will recognize that the metrics bar display may be configured to include any metrics control considered to be of interest to a viewer. In one embodiment, the orders metrics control 1105 is selected by the viewer. Accordingly, a spark line, such as spark line 1130, may be generated and displayed by the visualization service 355 that represents orders for items placed over a specific time segment within a metrics data stream 1157. Upon selection of the errors metrics control 1110, the visualization service 355 may generate and display a spark line, such as spark line 1135, representing errors occurring over a specific time segment within the metrics data stream 1157. Upon selection of the latency metrics control 1115, the visualization service 355 may generate and display information regarding any latency concerns/issues experienced over a specific time segment within the metrics data stream 1157. In yet another embodiment, upon selection of the page views metrics control 1120, the visualization service 355 may provide a spark line representing page views over a specific time segment within the metrics data stream 1157. Upon selection of the external events metric control 1125, the visualization service 355 may provide a short description of events related to the specific time segment under review, for example, "super bowl half time show."

In the illustrated embodiment, the detail metric bar display 1156 includes spark lines 1130 and 1135 corresponding to different selected metrics controls, e.g., order metrics control 1105 and errors metrics control 1110. Accordingly, multiple spark lines may be provided by the detail metric bar display 1156 to illustrate relationships between different metrics, for example, an increase in errors may lead to a decrease in orders.

In yet other embodiments, the detail metric bar display 1156 includes a scrubber bar 1140 that parses through the metrics data stream 1157 similar to a scrubber bar in video editing application. Accordingly, the detail metric bar display 1156 may enable the automatic/manual insertion of flags or markers where interesting data events occur within a metric data stream 1157. For example, a metric data stream 1157 may be marked to reflect when maintenance upgrades begin and end. Accordingly, the metric data stream 1157 may be viewed during maintenance upgrades in order to capture unexpected events in the network resource 325 that may ultimately be due to maintenance upgrades, rather than, e.g., a typical user error.

In other embodiments, the visualization service 355 enables comparison of user behavioral data by comparing a first time segment with a second time segment. In such embodiments, the visualization service 355 may provide a split screen display or an overlay display to compare visualizations of user behavioral data at different time segments. This comparison may be helpful in identifying changes in user behavior over different time segments, anomalies, performance issues, etc.

Figure 12:
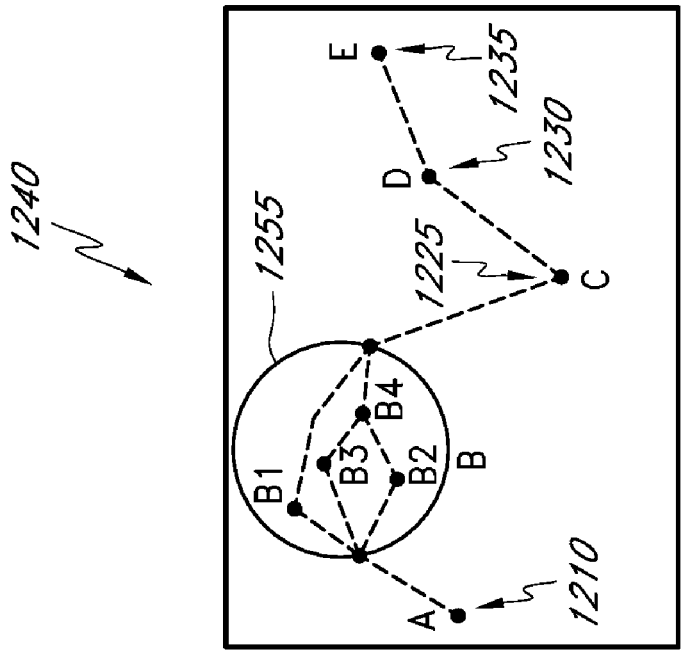
FIG. 12 illustrates graphical representations or visualizations that may be, upon selection of a state indicia included in the visualization, expanded or contracted to show the behavior of users at higher or lower state levels within the network resource.
Figure 12:
Figure 12:
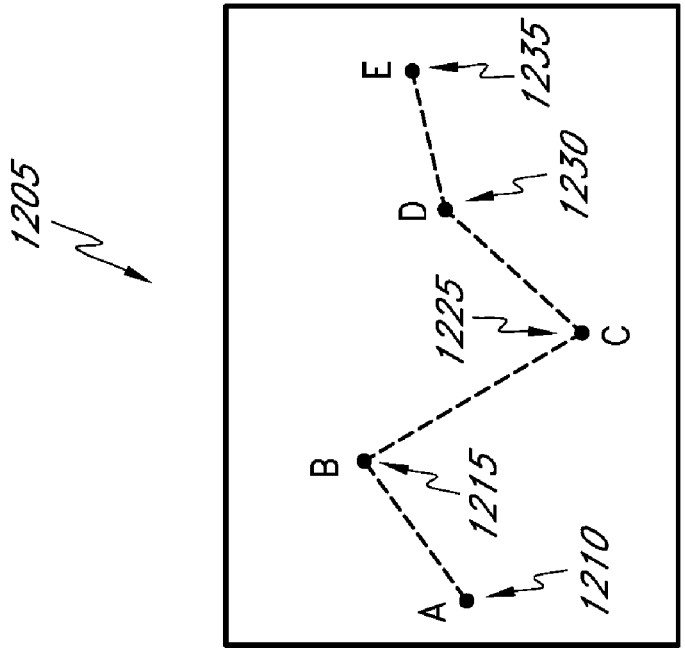

FIG. 12 illustrates graphical representations or visualizations generated by the visualization service 355 that may be, upon selection of a state indicia included in the visualization, expanded or contracted to show the behavior of users at higher or lower state levels within the network resource. More specifically, in one embodiment, the states available within a network resource may be organized hierarchically. Accordingly, the root node of the hierarchy may represent the entire network resource, child nodes or sub-nodes of the root node (or other sub-nodes) may represent different categories or sub-categories of states available in the network resource, and the leaf nodes of the hierarchy may represent individual states (e.g., files or web pages) available in the network resource.

As depicted in FIG. 12, the visualization service 355 may generate a visualization 1205 that reflects a path followed by a number of user among states A, B, C, D and E of the network resource. In the illustrated example, state B is actually a sub-category of states associated with a sub-node in the hierarchical structure representing the network resource. Accordingly, if a viewer selects state B 1215 (e.g., by "clicking" on the state or "node" indicium for state B displayed in the visualization 1205), the node indicium for state B may be expanded to show the state indicia for the states 1255 categorized under state B, e.g., states B1, B2, B3 and B4, and the paths formed among such states. Conversely, a viewer can deselect state B (e.g., by "clicking" in proximity to the expanded view of states 1255) to contract or collapse the state indicia for the states 1255 back to the node indicium for state B in the visualization 1205. Those skilled in the art will appreciate that since the states available from a network resource can be organized hierarchically, a viewer may use techniques similar to those described above to drill-down to sub-nodes and leaf nodes within the hierarchical structure representing the network resource including sub-categories of files or web pages or specific files or web pages available from the network resource or navigate up to higher level nodes within the hierarchical structure representing the network resource.

In some embodiments, the visualization service 355 may be configured to expand or collapse a node within the hierarchical structure automatically, rather than upon selection of an associated node indicium. For example, the node indicium for state B may be configured to automatically expand into the state indicia for states 1255 upon satisfaction of a threshold associated with the amount of user traffic to the states 1255. Those skilled in the art will appreciate that the visualization service 355 may be configured to automatically trigger expansion or contraction of a node based on any one of a number or combination of events without departing from the scope of the present disclosure.

In an effort to further organize graphical representations, the visualization service 355 may also provide capability to add or remove certain states from a visualization after rendering is provided. For example, the Sign In state 110 may be selected by a viewer to be removed from a visualization. Moreover, the visualization service 355 may also provide capability to permit a user (e.g., a viewer, system administrator, visualization designer, etc.) to manually or automatically move any or all states to a new location or position within the visualization. Among many available methods, a state may be selected and dragged to a new physical location in the visualization. Alternatively, automated organization of states may be preconfigured to provide the most efficient organization within the visualization. In yet other embodiments, the visualization service 355 may also enable a permit manual or automatic categorization of one or more states into a hierarchical structure of states, such as that described above. For example, a state indicium for a state may be dragged and dropped by a user into a node indicium for a node in the hierarchy. In yet other embodiments, the visualization service 355 may provide the capability to expand or collapse the user indicia presented on a path. For example, if such a large number of users are transitioning between the same to states, the path between those states in the visualization may become so blurred as to degrade the quality of the visualization. Accordingly, the visualization service 355 may be configures to automatically collapse the user indicia along such a path into a smaller subset (a subset including one or more) of user indicia, e.g., upon satisfaction of a user traffic threshold. Alternatively, the visualization service 355 may enable a user to manually select user indicia for contraction or expansion.

Figure 13:
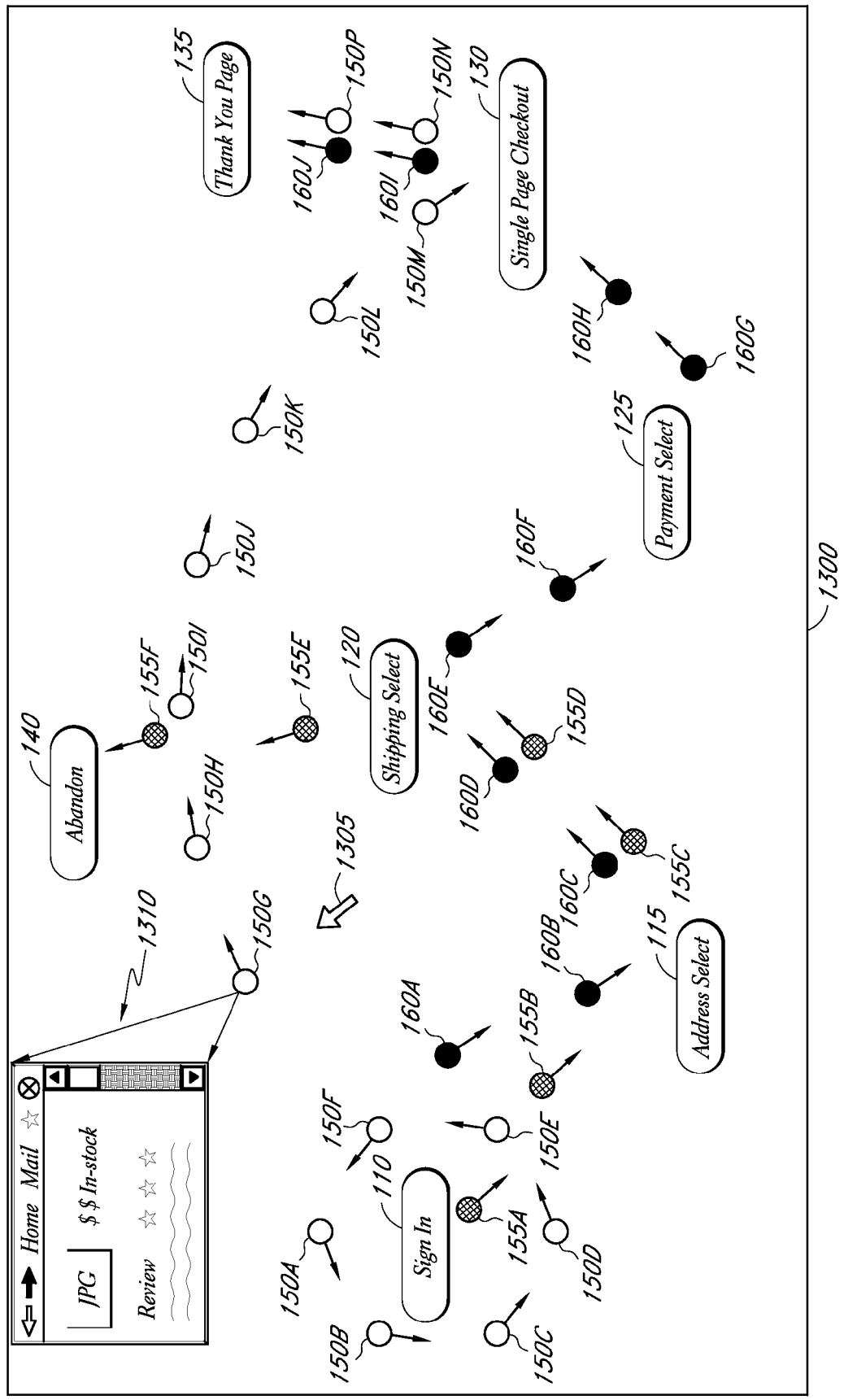
FIG. 13 is an illustrative graphical representation or visualization that includes a display of the file or page a user may be accessing at a particular point in time.

FIG. 13 is an illustrative graphical representation or visualization 1300 of the behavior of a small sample of users accessing the network resource 325. However, in this illustrated example, the visualization 900 includes a display of the file or page a user may be accessing at that particular point in time. For example, as depicted in FIG. 13, a viewer may locate and select an item detail control 1305 in the proximity of the user indicia associated with user 150. Upon selection of the item detail control 1305, the visualization service 355 displays, within the visualization 1300, a thumbnail image 1310 of the data file being viewed by user 150 at that particular point in time. Such a display may be helpful to customer support representatives in providing quick, one-on-one support to the user 150.

Figure 14:
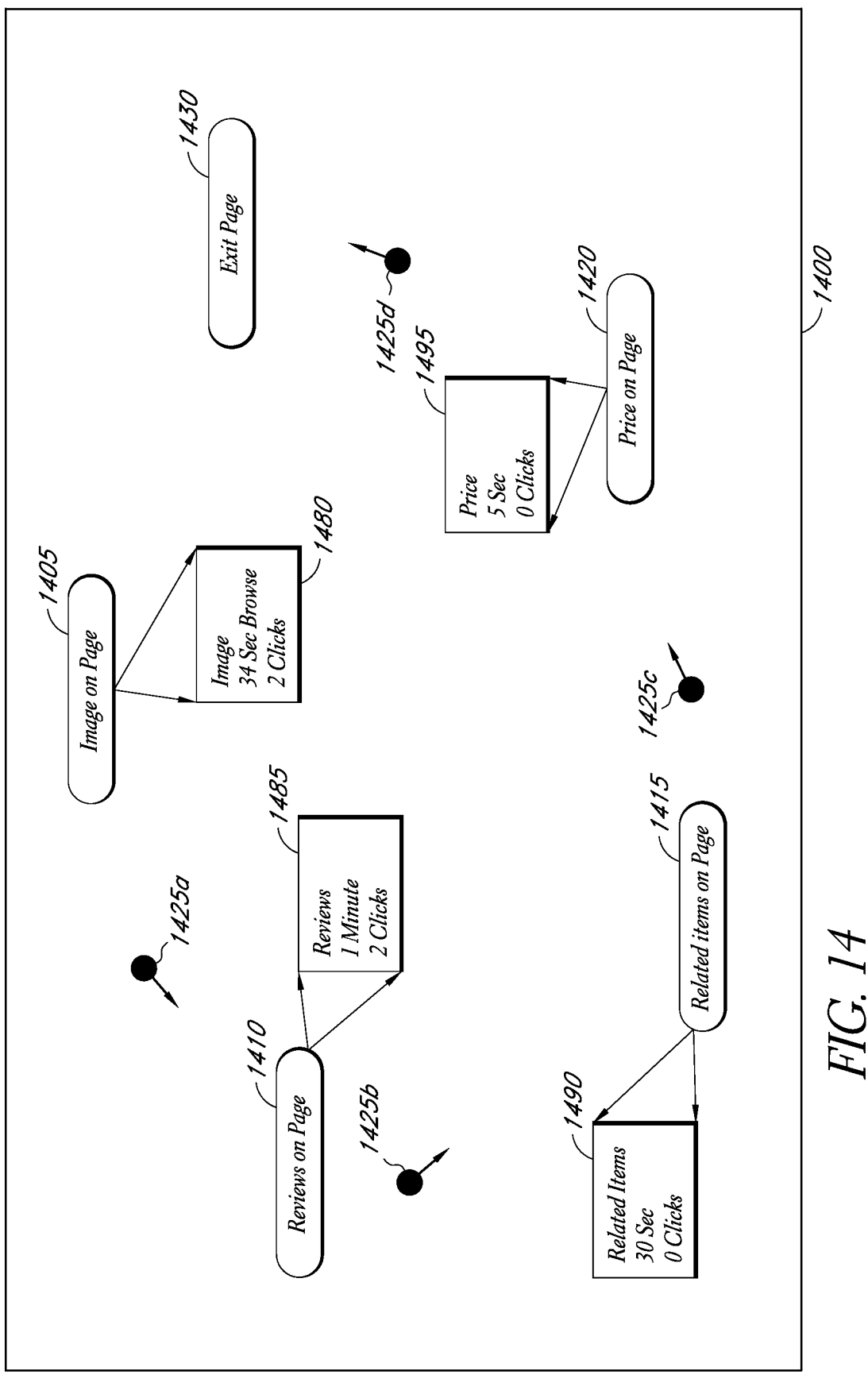
FIG. 14 is an illustrative graphical representation or visualization of a user traversing a path within a single file accessed from the network resource.

In addition to generating visualizations of user behavior among different files accessed from a network resource, the visualization service 355 may also generate visualizations of user behavior within a single file. Accordingly, FIG. 14 is an illustrative graphical representation or visualization 1400 of a user traversing a path within a single file (e.g., a web page) accessed from the network resource 355. The visualization 1400 includes states such as an Image on Page state 1405, a Reviews on Page state 1410, a Related-Items on Page state 1415, a Price on Page state 1420, and an Exit Page state 1430. As indicated by user indicia 1425A-1425D, the user 1425 traverses a path from one state within the page to another. For example, user 1425 traverses a path from the Image on Page state 1405 to the Reviews on Page state 1410, as depicted by the movement of user indicia 1425A. The user 1425 then traverses a path from Reviews on Page state 1410 to Related-Items on Page state 1415, as depicted by the movement of user indicia 1425B, and so on.

Moreover, in some embodiments, the graphical representation also includes a statistical data layer of user behaviors within a single data file. For example, as illustrated in FIG. 14, the statistical data layer includes statistics such as how long the user remained in the state and how many "clicks" the user made while in that state. For example, state statistic view bar 1480 reflects that user 1425 accessed the Image on Page state

1405 for 34 seconds and made two mouse clicks, while the state statistic view bar 1485 reflects that that user 1425 remained at the Review on Page state 1410 for one minute and made two mouse clicks. The visualization 1400 of user behavior within a single page may be helpful in illustrating areas within a data file of most importance or relevance to users or for other reasons.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language, such as, among others, "can," "could," "might," or "may," unless specifically stated otherwise, or otherwise understood within the context as used, are generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for graphically representing user behavior while users are accessing files from a network resource, the system comprising:
    a data source that identifies files accessed by users from the network resource and times at which the files were accessed by said users; and
    a computing device that executes:
        a first processing component operative to generate a path record for each user of a plurality of users,
            the path record generated using the identification of files and times identified by the data source, and
            the path record identifying the user, each file accessed by the user from the network resource, and the time at which each file was accessed by the user from the network resource; and
        a second processing component operative to generate a graphical representation based on the path records of the users for display, wherein each of two or more users are graphically represented in the graphical representation, the graphical representation comprising:
            a first indicium representing one of the two or more users;
            a second indicium representing a first file accessed by the one of the two or more users from the network resource; and
            a third indicium representing a second data file accessed by the one of the two or more users from the network resource,
            the first indicium graphically migrating from the second indicium to the third indicium to graphically represent the transition of the one of the two or more users from the first file accessed from the network resource to the second file accessed from the network resource over a time period between the time at which the first file was accessed by the one of the two or more users from the network resource and the second file was accessed by the one of the two or more users from the network resource, wherein the first indicium graphically migrates from the second indicium to the third indicium at a velocity based at least in part on the time period between the time at which the first file was accessed by the one of the two or more users and the time at which the second file was accessed by the one of the two or more users.

2. The system of claim 1, wherein the files are web pages.

3. The system of claim 1, wherein the first indicium graphically migrates from the second indicium to the third indicium over a path determined using a parametric equation.

4. The system of claim 1, wherein the files are identified in the path record in ascending order according to time of access.

5. The system of claim 1, wherein the data source is at least one of a network resource log and user behavioral data store.

6. A computer-implemented method for graphically representing user behavior while users are accessing files from a network resource, the computer-implemented method comprising:
    as implemented by one or more computing devices configured with specific executable instructions,
        generating a path record for each user of a plurality of users, the path record generated using an identification of files accessed by the plurality of users from the network resource and times at which the files were accessed by said users,
            wherein the path record identifies the user, each file accessed by the user from the network resource, and the time at which each file was accessed by the user from the network resource; and
        generating a graphical representation based on the path records of the users for display, wherein each of two or more users are graphically represented in the graphical representation, the graphical representation comprising:
            a first indicium representing one of the two or more users;
            a second indicium representing a first file accessed by the one of the two or more users from the network resource; and
            a third indicium representing a second data file accessed by the one of the two or more users from the network resource,
            the first indicium graphically migrating from the second indicium to the third indicium to graphically represent the transition of the one of the two or more users from the first file accessed from the network resource to the second file accessed from the network resource over a time period between the time at which the first file was accessed by the one of the two or more users from the network resource and the second file was accessed by the one of the two or more users from the network resource, wherein the first indicium graphically migrates from the second indicium to the third indicium at a velocity based at least in part on the time period between the time at which the first file was accessed by the one of the two or more users and the time at which the second file was accessed by the one of the two or more users.

7. The computer-implemented method of claim 6, wherein the files are web pages.

8. The computer-implemented method of claim 6, wherein the first indicium graphically migrates from the second indicium to the third indicium over a path determined using a parametric equation.

9. The computer-implemented method of claim 6, wherein the files are identified in the path record in ascending order according to time of access.

10. A non-transitory computer readable medium having computer executable components, the computer executable components comprising:
   a first component operative to generate a path record for each user of a plurality of users,
      the path record generated using an identification of files accessed by the plurality of users from a network resource and times at which the files were accessed by said users, and
      the path record identifying the user, each file accessed by the user from the network resource, and the time at which each file was accessed by the user from the network resource; and
   a second component operative to generate a graphical representation based on the path records of the users for display, wherein each of two or more users are graphically represented in the graphical representation, the graphical representation comprising:
      a first indicium representing one of the two or more users;
      a second indicium representing a first file accessed by the one of the two or more users from the network resource; and
      a third indicium representing a second data file accessed by the one of the two or more users from the network resource,
      the first indicium graphically migrating from the second indicium to the third indicium to graphically represent the transition of the one of the two or more users from the first file accessed from the network resource to the second file accessed from the network resource over a time period between the time at which the first file was accessed by the one of the two or more users from the network resource and the second file was accessed by the one of the two or more users from the network resource, wherein the first indicium graphically migrates from the second indicium to the third indicium at a velocity based at least in part on the time period between the time at which the first file was accessed by the one of the two or more users and the time at which the second file was accessed by the one of the two or more users.

11. The non-transitory computer readable medium of claim 10, wherein the files are web pages.

12. The non-transitory computer readable medium of claim 10, wherein the first indicium graphically migrates from the second indicium to the third indicium over a path determined using a parametric equation.

13. The non-transitory computer readable medium of claim 10, wherein the files are identified in the path record in ascending order according to time of access.

* * * * *

UNITED STATES PATENT AND TRADEMARK OFFICE
CERTIFICATE OF CORRECTION

PATENT NO. : 8,250,473 B1
APPLICATION NO. : 12/365033
DATED : August 21, 2012
INVENTOR(S) : Haynes et al.

Page 1 of 1

It is certified that error appears in the above-identified patent and that said Letters Patent is hereby corrected as shown below:

Title Page (Item 73, Assignee) at line 1, Change "Technoloies," to --Technologies,--.

Signed and Sealed this
Fifteenth Day of October, 2013

Teresa Stanek Rea
*Deputy Director of the United States Patent and Trademark Office*